US011387651B2

(12) United States Patent
Samaan et al.

(10) Patent No.: US 11,387,651 B2
(45) Date of Patent: Jul. 12, 2022

(54) COORDINATED VOLTAGE CONTROL AND REACTIVE POWER REGULATION BETWEEN TRANSMISSION AND DISTRIBUTION SYSTEMS

(71) Applicant: BATTELLE MEMORIAL INSTITUTE, Richland, WA (US)

(72) Inventors: Nader A. Samaan, Richland, WA (US); Xinda Ke, Richland, WA (US); Jesse T. Holzer, Kennewick, WA (US); Renke Huang, Richland, WA (US); Bharat Vyakaranam, Redmond, WA (US); Mallikarjuna Vallem, Richland, WA (US); Marcelo A. Elizondo, Seattle, WA (US); Yuri Makarov, Richland, WA (US); Ning Lu, Cary, NC (US); Xiangqi Zhu, Arvada, CO (US); David Mulcahy, Raleigh, NC (US); Catherine McEntee, Raleigh, NC (US)

(73) Assignees: Battelle Memorial Institute, Richland, WA (US); North Carolina State University, Raleigh, NC (US)

( * ) Notice: Subject to any disclaimer, the term of this patent is extended or adjusted under 35 U.S.C. 154(b) by 314 days.

(21) Appl. No.: 16/534,972

(22) Filed: Aug. 7, 2019

(65) Prior Publication Data
US 2020/0373759 A1 Nov. 26, 2020

Related U.S. Application Data

(60) Provisional application No. 62/853,043, filed on May 26, 2019, provisional application No. 62/853,041, filed on May 26, 2019.

(51) Int. Cl.
*H02J 3/18* (2006.01)
*H02J 3/38* (2006.01)

(52) U.S. Cl.
CPC .............. *H02J 3/18* (2013.01); *H02J 3/383* (2013.01); *G05B 2219/2639* (2013.01)

(58) Field of Classification Search
CPC .......... H02J 3/18; H02J 3/383; H02J 2300/24; H02J 3/381; H02J 3/144;
(Continued)

(56) References Cited

U.S. PATENT DOCUMENTS

| 8,489,632 | B1 * | 7/2013 | Breckenridge | ...... G06K 9/6288 707/778 |
| 2012/0010757 | A1 * | 1/2012 | Francino | ................... H02J 3/14 700/291 |

(Continued)

OTHER PUBLICATIONS

Ke, et al., "A Three-Stage Enhanced Reactive Power and Voltage Optimization Method for High Penetration of Solar", Electrical Infrastructure Group; Pacific Northwest National Laboratory; in the Proc. of IEEE/PES General Meeting, Chicago, Jul. 2017, 5 pages.

(Continued)

*Primary Examiner* — Thomas C Lee
*Assistant Examiner* — Charles Cai
(74) *Attorney, Agent, or Firm* — Colby Nipper PLLC

(57) ABSTRACT

Systems and methods are described for coordinating volt-var control between sub-transmission and distribution systems. Distributed energy resources of a distribution system are aggregated into virtual power plants from which reactive power can optimally be dispatched to the sub-transmission system. A sub-transmission controller executes a volt-var AC optimal power flow optimisation function to minimize voltage fluctuations that might otherwise occur when coordinating with a distribution system having distributed energy resources. The distribution system can use a sensitivity matrix for regulating voltage at distribution feeders while fulfilling a transmission or sub-transmission system's demand requests.

20 Claims, 19 Drawing Sheets

(58) Field of Classification Search
CPC .......... G05B 2219/2639; Y04S 20/222; Y02B 70/3225; Y02E 40/30; Y02E 10/56
See application file for complete search history.

(56) References Cited

U.S. PATENT DOCUMENTS

| | | | |
|---|---|---|---|
| 2014/0163761 A1* | 6/2014 | Kuhns | H02J 4/00 700/295 |
| 2016/0218506 A1* | 7/2016 | Bamberger | H02J 3/00 |
| 2017/0177016 A1* | 6/2017 | Chiang | G05F 1/12 |
| 2018/0226799 A1* | 8/2018 | Baker | G06Q 50/06 |
| 2018/0321650 A1* | 11/2018 | Feng | H02J 13/00002 |
| 2018/0358812 A1* | 12/2018 | Anderson | G05B 15/02 |
| 2019/0148977 A1* | 5/2019 | Kuroda | H02J 3/18 700/286 |
| 2019/0372350 A1* | 12/2019 | Joko | G05B 15/02 |

OTHER PUBLICATIONS

Ke, et al., "Coordinative Real-time Sub-Transmission Volt-Var Control for Reactive Power Regulation between Transmission and Distribution Systems", IET Generation Transmission & Distribution; ResearchGate, May 2019, 10 pages.

McEntee, et al., "A VSM-Based DER Dispatch MINLP for Volt-VAR Control in Unbalanced Power Distribution Systems", Conference Paper; ResearchGate, Aug. 2019, 6 pages.

Zhu, et al., "A Hierarchical VLSM-Based Deman Response Strategy for Coordinative Voltage Control between Transmission and Distribution Sytems", Article in IEEE Transactions on Smart Grid; ResearchGate, Sep. 2018, 11 pages.

\* cited by examiner

COORDINATED VOLTAGE CONTROL AND REACTIVE POWER REGULATION BETWEEN TRANSMISSION AND DISTRIBUTION SYSTEMS

PRIORITY/CROSS-REFERENCE TO RELATED APPLICATIONS

This application claims priority to U.S. provisional application Ser. Nos. 62/853,041 and 62/853,043, each of which was filed on May 26, 2019; the entire content of each is hereby incorporated by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

The adoption of distributed energy resources (e.g., rooftop photovoltaic inverters, megawatt-level photovoltaic farm inverters, smart thermostats, energy storage devices) and demand response or virtual power plant strategies for power transmission systems, is rapidly increasing throughout the world. For instance, driven by reductions in costs, increases in electricity prices, and tighter requirements on sustainability, more countries are installing solar power producing devices to meet demand. Integrating and operating different types of distributed energy resources amongst legacy power systems can be a challenge. For example, distributed energy resources can cause rapid voltage variations, large voltage ramps, and other voltage problems in a distribution system. The voltage problems caused by the distributed energy resources may propagate to sub-transmission and transmission systems. More frequent and larger voltage fluctuations reduce reliability and power quality and require voltage control devices to compensate for such fluctuations more frequently, causing significant wear and reducing operating lifespans of the voltage control devices.

SUMMARY

This disclosure describes techniques for coordinating volt-var control between sub-transmission and distribution systems through optimal, reactive power dispatch of distributed energy resources that have been aggregated as virtual power plants. At the sub-transmission system, a sub-transmission controller can coordinate shunt devices and the virtual power plants to determine an amount of reactive power to dispatch from the virtual power plants of the distribution system. The sub-transmission controller may execute a volt-var control function (e.g., periodically every five minutes or some other interval) that limits voltage deviations at load buses to desirable levels, minimizes losses at the load buses, minimizes solar curtailment, minimizes virtual power plant usage, and minimizes mechanical switching of the shunt elements. The sub-transmission controller may execute the volt-var control function using alternating current (AC) optimal power flow techniques. At the distribution system, a distribution controller may dispatch, from the virtual power plants, the amount of reactive power determined by the sub-transmission controller. The distribution controller can execute a respective volt-var control function for each virtual power plant to control the distributed energy resources of the virtual power plant and dispatch the amount of reactive power determined by the sub-transmission controller. Each virtual power plant controls the respective distributed energy resources to meet sub-transmission service requirements while satisfying constraints of the distribution system. The distribution controller may periodically (e.g., every five minutes or some other interval) update a respective, reactive-power capability for each of the virtual power plants to enable the sub-transmission controller to determine the amount of reactive power to dispatch from the virtual power plant during a future dispatch interval.

The distribution controller may maintain a hierarchical two-stage voltage-load sensitivity matrix (referred to simply as "a sensitivity matrix") for regulating voltage at the distribution energy resources of the distribution system, which have been aggregated as virtual power plants, to satisfy dispatch requests from the sub-transmission system. A distribution controller uses the sensitivity matrix to maintain voltage at the virtual power plants including executing respective volt-var control functions of the virtual power plants using the sensitivity matrix when dispatching reactive power requested by a sub-transmission controller. Maintaining the sensitivity matrix enables the distribution controller to provide transmission-level services to the sub-transmission system without disrupting or causing operational issues at other parts of the distribution system.

In one example, a method is described which is performed by a sub-transmission system for coordinating volt-var control with a distribution system. The method includes receiving, by a sub-transmission controller of the sub-transmission system and from an energy management system, operational set points of the sub-transmission system, determining, by the sub-transmission controller and based on the operational set points, virtual power plant requirements for the distribution system, and sending, by the sub-transmission controller and to a distribution controller of the distribution system, the virtual power plant requirements to achieve the operational set points of the sub-transmission system.

In another example, a sub-transmission system includes a sub-transmission controller configured to perform the method of the previous example.

In another example, a computer-readable storage medium is described which includes instructions that, when executed, configure a sub-transmission controller of a sub-transmission system to perform the method of the previous example.

In another example, a method is described which is performed by a distribution system for coordinating volt-var control with a sub-transmission system. The method includes receiving, by a distribution controller of the distribution system and from a sub-transmission controller of the sub-transmission system, virtual power plant requirements of the sub-transmission system, controlling, by the distribution controller, based on the virtual power plant requirements, one or more distributed energy resources of the distribution system, responsive to controlling the one or more distributed energy resources, determining, by the distribution controller, future virtual power plant capacity of the one or more distributed energy resources, and sending, by the distribution controller and to the sub-transmission controller, the future virtual power plant capacity.

In another example, a distribution system includes one or more distributed energy resources and a distribution controller configured to perform the method of the previous example.

In another example, a computer-readable storage medium is described which includes instructions that, when executed, configure a distribution controller of a distribution system to perform the method of the previous example.

Figure 1:
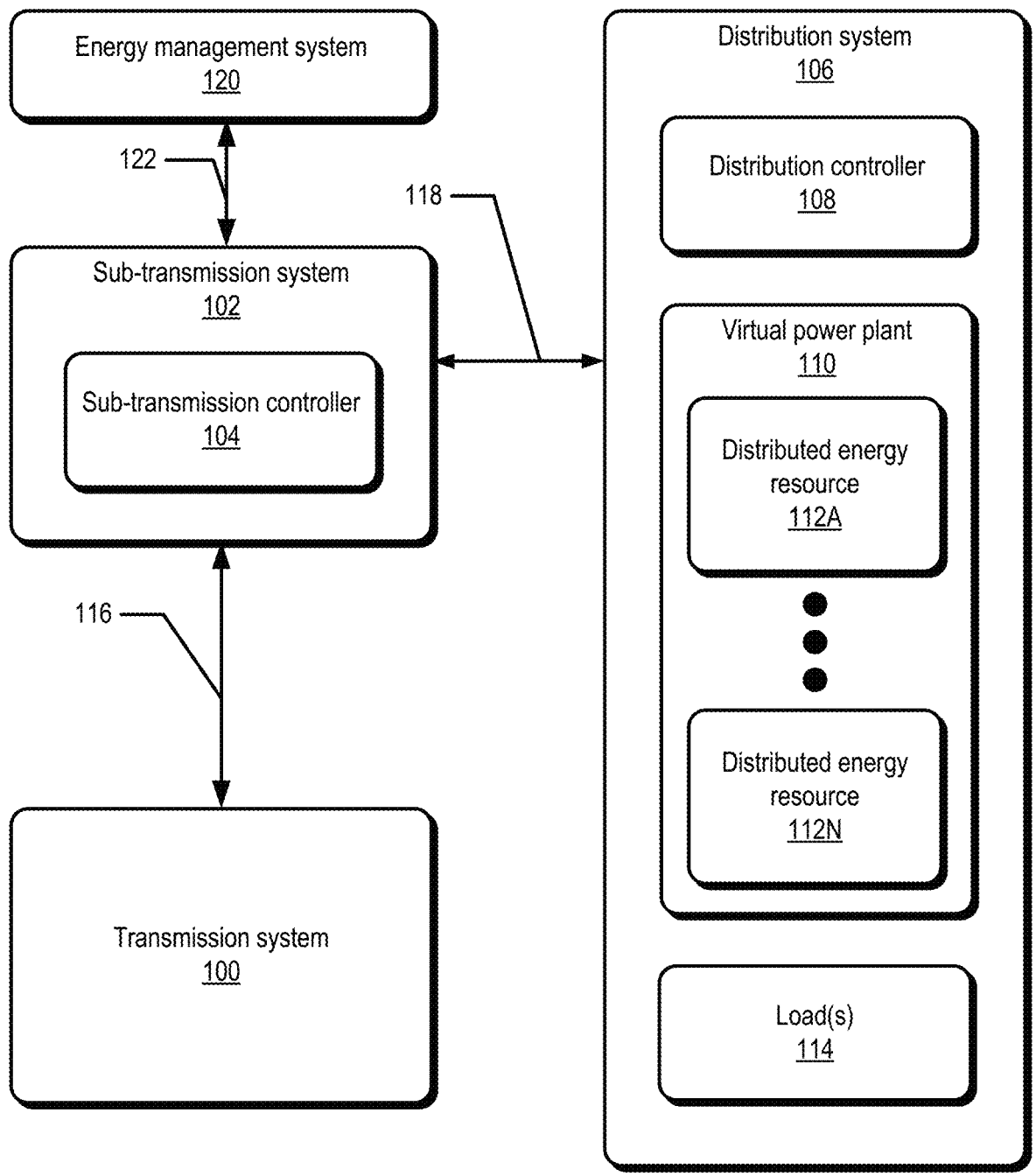
FIG. 1 is a conceptual diagram illustrating a transmission system and a sub-transmission system configured to coordinate volt-var control with a distribution system.

NOMENCLATURE $A_{PV}$, $B_{PV}$ Constant parameter of PV price function
$b_i^s$ Shunt susceptance at bus i, if any
$b^{\Delta_{ik}}$ Step size of shunt block k at bus i
$b_{ijc}$ Series susceptance of circuit c between bus i and j
$b_{ijc}^c$ Shunt susceptance of circuit c between bus i and j
c Circuit number
$C_1$ Total cost of demand response (virtual power plant) for first stage ($)
$C_2$ Total cost of demand response (virtual power plant) for second stage ($)
$C_{PV}$ Cost of demand response (virtual power plant) using PV ($)
$C_{Load}$ Cost of demand response (virtual power plant) using controllable loads ($)
$C_{Cap}$ Cost of employing capacitors to fulfill requirement ($)
$d_i^P$, $d_i^Q$ Real and reactive power demand at bus i
E Set of lines
$f_n$ Objective functions of the optimal volt-var control function
$f_n^{norm}$ Normalized objective functions of the optimal volt-var control function
$f_j^{up}$ Probability for appliance j to be turned on
$f_j^{down}$ Probability for appliance j to be turned off
$g_{ijc}$ Series conductance of circuit c between bus i and j
$g_i^s$ Shunt conductance at bus i, if any
$G_i$ Set of generators at bus i
$I_{ijc}^R$, $I_{ijc}^I$ Real and imaginary parts of current between bus i and bus j
$I_{ijcap}^2$ Maximum line current limit between bus i and j
i, j System buses (also referred to as system nodes)
k Improved factor for reactive power constraint, 1.1 for a normal IGBT-based PV inverter
$K_i$ Set of blocks of switched shunt at bus i
L Set of target load buses (L⊂N)
m Generator number
n Number of nodes considered in a voltage-load sensitivity matrix
$n_T$ Number of time steps in one power flow case
N Number of nodes in a distribution system
$N_{APP}$ Number of appliances participating in demand response (virtual power plant) in a house
$P_i^s$ PV real power generation at bus i
$P_m^{sch}$ Scheduled real power from generator m
$P_i^{Cmax}$ Maximum solar active power curtailment for solar at bus i
$P_{PV}(i)$ Current PV power output at node i (kW)
$P_{DR}^{PV}(i)$ PV curtailment on node i (kW)
$P_{DR}^{PV}|_{max}(i)$ Maximum PV curtailment possible at node i (kW)
$P_{DR}^{Load}(i)$ Demand response (virtual power plant) using controllable load at node i (kW)
$P_{DR}^{Load}|_{max}^{up}(i)$ Maximum load increase possible at node i (kW)
$P_{DR}^{Load}|_{max}^{down}(i)$ Maximum load decrease possible at node i (kW)
$P_{DR}^{Total}$ Total demand response (virtual power plant) requirement of real power (kW)

$P_{DR}^{PV}|_2$ (i) PV curtailment at node i for second stage (kW)
$P_{DR}^{Load}|_2$ (i) Demand response (virtual power plant) using controllable load at node i for this second-stage control (kW)
$P_{DR}^{Total}|_2$ Total demand response (virtual power plant) of real power implemented in the second stage (kW)
$P_{DR}^{limit}|_{high}$ Demand response (virtual power plant) high limit of real power (kW)
$P_{DR}^{limit}|_{low}$ Demand response (virtual power plant) low limit of real power (kW)
$P_{App}^{Rate}(j)$ Rated power of appliance j (kW)
$\hat{P}_{PV}^{Total}$ Forecasted total PV output at next time step (kW)
$\delta P$ Real power perturbation (kW)
$P_{ij}$ Sensitivity factor for real power
P Set of load buses with VPPs (P⊂N)
$P_i^c$ Real power curtailment from PV at bus i
$P_m^g$ Real power from generator m
$Q_i^{DR\,max}$, $Q_i^{DR\,min}$ Maximum and minimum limit of reactive power from demand response (virtual power plant) at bus i
$Q_m^{max}$, $Q_m^{min}$ Maximum and minimum reactive power limit of generator m
$Q_i^{Smax}$, $Q_i^{Smin}$ Maximum and minimum reactive power limit of aggregated solar at bus i
$Q_i^{DR}$ Reactive power from demand response (virtual power plant) at bus i
$Q_i^s$ Reactive power from PV at bus i
$Q_m^g$ Reactive power from generator m
$Q_{DR}^{PV}|_{max}(i)$ Maximum possible reactive power support provided by smart inverter at node i (kvar)
$Q_{DR}^{Total}$ demand response (virtual power plant) requirement of reactive power (kvar)
$Q_{Cap}(i)$ The capacity of the capacitor at node i (kvar)
$Q_{DR}^{PV}|_2$ (i) Reactive power generation or absorption of a smart inverter on node i in the second stage (kvar)
$Q_{DR}^{Total}|_2$ Total demand response (virtual power plant) of reactive power implemented in the second stage (kvar)
$Q_{DR}^{limit}|_{high}$ Demand response (virtual power plant) high limit of reactive power (kvar)
$Q_{DR}^{limit}|_{low}$ Demand response (virtual power plant) low limit of reactive power (kvar)
$q_{ij}$ Sensitivity factor for reactive power
$r_{PV}^P$ Fraction of PV real power available for curtailment
$r_{PV}^Q$ Fraction of PV reactive power available for demand response (virtual power plant)
$S_{PV}(i)$ Capacity of PV panels at node i (kW)
s(i) Status of "on" or "off" (1 or 0) of the capacitor at node i
S Set of buses having switched shunts (S⊂N)
$s_i^t$ Target voltage at load bus i
$S_i$ Maximum power rating of the PV at bus i
$T_{out}$ Room temperature (° F.)
$T_{set}$ Air conditioner set point (° F.)
t Time step
$v_m^{sch}$ Scheduled voltage of generator m
$v_i^{set}$ Target voltage at bus i
$v_{db}$ Dead band for target load buses voltage range
$\underline{V}_i$, $\overline{V}_i$ Lower and upper voltage limits at bus i
$V_i^R$, $V_i^I$ Real and imaginary parts of voltage at bus i
$V_m^g$ Voltage of generator m
$V_0(i)$ Voltage magnitude of each node at current time step (p.u.)
$V_1(i)$ Voltage magnitude of each node at current time step after first-stage control (p.u.)
$V_2(i)$ Voltage magnitude of each node at current time step after second-stage control (p.u.)
$V_{limit}^{low}$ Lower bound of voltage limit (p.u.)
$V_{limit}^{high}$ Upper bound of voltage limit (p.u.)
$|VLSM_P|_{N\times N}$ Real power of voltage-load sensitivity matrix
$|VLSM_Q|_{N\times N}$ Reactive power of voltage-load sensitivity matrix
$w_n$ Weighting coefficients for different objective functions
$x_{ik}^{max}$ The number of steps in shunt block k at bus i
$x^*_{ik}$ Initial number of steps switched on of switched shunt block k at bus i
$x_{ik}$ Number of steps switched on of switched shunt block k at bus i
$Z_1$ Minimization objective
$Z_2$ Minimization objective for second stage
$\tau_{ijc}$, $\phi_{ijc}$ Tap ratio and phase shift of the transformer c between buses i and j, if any
$\lambda_{PV}^P$ Price of real power curtailment at smart inverter ($/kW)
$\Delta V$ Total squared voltage deviation (p.u.²)
$\delta V(i)$ Voltage deviation at bus i
$\lambda_{PV}^Q$ Price of reactive power generation or absorption at smart inverter ($/kvar)
$\lambda_{Cap}$ Price of turning on the capacitor at node i, $/kvar
$\lambda_{Load}$ Price of demand response (virtual power plant) of controllable loads at node i ($/kW)
$\overline{\omega}_1 \ldots \overline{\omega}_5$ Weight coefficient
ξ Correction coefficient
θ Correction constant

DETAILED DESCRIPTION

The addition of distributed energy resources within a distribution system introduces bidirectional power flows which can significantly change typical, net-load patterns. Various ways have been explored to minimize voltage problems, caused by integrating distributed energy resources within a distribution system, from propagating from the distribution system to sub-transmission and transmission systems. One option for resolving such voltage issues includes revising settings for utility-owned, voltage regulation devices that exist in a distribution system, including adjusting voltage regulators, load tap changers, and capacitor banks in the distribution system. Another option includes incorporating shunt devices in the sub-transmission or transmission systems to prevent the propagation of voltage problems originating from the distribution system. However, distribution systems typically only include a few voltage regulation devices as effectiveness of the voltage regulation devices may be limited by location. Mechanically switched capacitor banks and shunt devices are typically limited in levels of control and frequently switching capacitor banks and shunt devices may lead to power losses in addition to significantly reducing the operating lifespan of the devices.

Another way to resolve voltage problems caused by distributed energy resources of a distribution system includes varying loads under a "demand response" or "virtual power plant" program. When distributed energy resources produce large amounts of power (e.g., on sunny days), electricity consumption by the loads can be increased and when the opposite occurs (e.g., at night or under cloud cover) and less power is produced by distributed energy resources, electricity consumption from the loads can be reduced. Although virtual power plant programs have been extensively investigated for providing transmission and sub-transmission services for peak shaving and load shifting, virtual power plant programs may not provide voltage control. Virtual power plant programs have been applied to some automated distribution systems for voltage control, however these programs address resolving voltage issues during emergency events (e.g., during outages of generators and lines). Other virtual power plant programs that aggregate small electric appliances to provide voltage regulation have been tried, however distributed energy resources were not considered.

Some distribution systems apply sensitivity coefficients to compensate for voltage problems. A distribution system may have to frequently recalculate sensitivity coefficients based on state estimates of the distribution system. State estimates can be inaccurate and difficult to determine due to a lack of measurement units embedded in the distribution system. Further, frequently recalculating sensitivity coefficients may increase computational load on the distribution system.

In any case, making changes to a distribution system without coordinating with a transmission and sub-transmission system may be insufficient for preventing voltage problems that originate from the distribution system, from propagating to the transmission and sub-transmission systems. When a large quantity of distributed energy resources is connected to a distribution system, voltage regulation at the distribution, sub-transmission, and transmission level becomes increasingly critical.

Unfortunately, despite having a physical coupling, transmission, sub-transmission, and distribution systems, respective controllers of the systems may exchange little information to perform limited coordination. Traditionally, a transmission or sub-transmission controller may treat each distribution system as an "integrated passive load injector" and may not receive detailed information about the distribution system, such as nodal voltages, branch flows, or other information beyond that obtained by meters. Similarly, a distribution controller may control operations of a distribution system without receiving information from the transmission or sub-transmission systems and instead may simplify a sub-transmission or transmission system as an infinite bus model.

To prevent voltage problems that can occur in response to integrating distributed energy resources within a distribution system, this disclosure describes techniques for coordinating volt-var control between sub-transmission and distribution systems including aggregating the distributed energy resources of a distribution system into virtual power plants from which reactive power can optimally be dispatched to the sub-transmission system. Further described is a volt-var AC optimal power flow optimization function executed by a sub-transmission controller minimize voltage fluctuations that might otherwise occur when a sub-transmission system is coupled to a distribution system having distributed energy resources. The sub-transmission controller may coordinate operations between the virtual power plants of the distribution system and mechanically switched shunts of the sub-transmission system to effectively provide voltage support services to a transmission system. The disclosure further describes ways enabling the distribution system to use a sensitivity matrix for regulating voltage at distribution feeders while fulfilling a transmission or sub-transmission system's demand requests.

FIG. 1 is a conceptual diagram illustrating a transmission system and a sub-transmission system configured to coordinate volt-var control with a distribution system. As illustrated in FIG. 1, a transmission system 100 is connected, via a sub-transmission system 102, to a distribution system 106. The transmission system 100 shares a connection 116 with the sub-transmission system 102. The sub-transmission system 102 shares a connection 118 with the distribution system 106. The sub-transmission system 102 includes a sub-transmission controller 104. The distribution system 106 includes a distribution controller 108, loads 114, and a virtual power plant 110 formed from aggregating a plurality of distributed energy resources 112A through 112N (collectively referred to as "distributed energy resources 112") of the distribution system 106.

FIG. 1 further illustrates an energy management system 120 operatively coupled to the sub-transmission system 102 via connection 122. The energy management system 120 is configured to coordinate operational points established by the energy management system 120 that are passed from the sub-transmission controller 104 to the distribution system 106 as part of coordination information being exchanged over connection 118.

The sub-transmission controller 104 and the distribution controller 108 may each be implemented as one or more respective processors, processing units, integrated circuits, or computing devices configured to execute operations associated with power management and distribution within the sub-transmission system 102 and the distribution system 106. The sub-transmission controller 104 and the distribution controller 108 may constitute respective modules that execute within a computing environment to provide power management and distribution services within the sub-transmission system 102 and the distribution system 106. The sub-transmission controller 104 and the distribution controller 108 may each include a respective memory or other non-transitory computer-readable storage media that has been encoded with instructions that, when executed by one or more respective processors, perform the power management and distribution services attributed to the sub-transmission controller 104 and the distribution controller 108.

The loads 114 represent commercial or residential distribution points within the distribution system 106 for receiving adjusted electrical power from the sub-transmission system 102. Examples of the loads 114 include residences, commercial businesses, industrial consumers, government entities, and other consumers that rely on the distribution system 106 for power.

The distributed energy resources 112 represent distribution feeders to the distribution system 106. Each of the distributed energy resources 112 can provide capacity to the distribution system 106 that can be used to supplement adjusted power received from the sub-transmission system 102 to power the loads 114. While primarily described as photovoltaic type distributed energy resources (e.g., rooftop photovoltaic inverters, megawatt-level photovoltaic farm inverters) other examples of the distributed energy resources 112 exist. As some examples, the distributed energy resources 112 may include geothermal, hydroelectric, wind-based inverter units, and energy storage devices configured to provide electrical capacity to the distribution system 106. The distributed energy resources 112 may also include smart thermostats and other devices that can be controlled to implement a virtual power plant strategy.

In general, the transmission system 100 delivers electrical power and control signals to the sub-transmission system 102 via the connection 116. The sub-transmission controller 104 interprets the control signals from the transmission system and causes the sub-transmission system 102 to adjust (e.g., step-down, step-up, frequency shift, phase shift) the electrical power received from the transmission system 100 for consumption by the distribution system 106. The sub-transmission system 102 delivers the adjusted electrical power and coordination information to the distribution system 106 over the connection 118. The distribution controller 108 controls the distribution system 106, based on the coordination information received from the sub-transmission controller 104, to distribute the adjusted electrical power to the loads 114. For example, the coordination information can include voltage set point, real/reactive power requirements established by the energy management system 120. The virtual power plant 110 is configured to inject additional electrical capacity into the distribution system 106 to assist in powering the loads 114. The distribution controller 108 controls the distributed energy resources 112 of the virtual power plant 110, based on the coordination information received from the sub-transmission controller 104, to assist n powering the loads 114 in view of the adjusted electrical power being distributed to the loads 114.

The aforementioned process constitutes an "operational interval." The transmission system 100, the sub-transmission system 102, and the distribution system 106 may repeat the aforementioned process, conducting a sequence of operational intervals, to continuously supply electrical power from the transmission system 100 and the virtual power plant 110 to power the loads 114.

The sub-transmission controller 104 may model the distribution system 106 as a bus in view of other distribution systems that are connected to the sub-transmission system 102, which are likewise modeled by the sub-transmission controller as buses. In addition, or alternatively, the sub-transmission controller 104 may model the distribution system 106 using a reduction approach in which a reduced model for a distribution substation is used to model the virtual power plants. For example, a typical distribution feeder can have thousands of nodes, and there can be thousands of such feeders in a given utility system. To facilitate the coordinative operation and control between the sub-transmission system 102 and the distribution system 106, the sub-transmission controller 104 may execute a model reduction tool to reduce the size of the distribution system 106 (e.g., by more than eighty percent) while preserving the accuracy of power-flow results. The model reduction tool can retain essential circuit elements of the distribution system 106, such as load-tap-changer (LTC) capacitors, and voltage regulators.

Initially, during each operation interval, the Energy Management System 120 may execute an optimal power flow function to determine an optimal adjustment of real and reactive power received over connection 116 to minimize loss, cost, or voltage deviations on each of the distribution systems that the sub-transmission controller 104 models as buses that share connections with the sub-transmission system 102. After executing the optimal power flow function, the transmission-level controller 104 receives voltage set point, real/reactive power requirements, etc. from the Energy Management System 120 and communicates respective virtual power plant commands (e.g., a required real and reactive power increase or decrease) to the distribution controller 108 and to each distribution controller of each of the other distributions systems that share connections with the sub-transmission system 102.

Each distribution controller 108 in the distribution system 106 controls the respective VPP 110 to meet sub-transmission service requirements received from the sub-transmission system 102 while satisfying constraints of the distribution system 106. In an initial stage, the distribution controller 108 may execute a dispatch function to deliver the adjusted electrical power to the loads 114 with an objective to minimize voltage deviations and virtual power plant cost. When executing the dispatch function, the distribution controller 108 can rely on a voltage-load sensitivity matrix (referred to simply as "a sensitivity matrix") to determine how the adjusted electrical power should be dispatched to the loads 114. The distribution controller 108 can check actual voltage violations from dispatching the adjusted electrical power during the initial stage to determine initial-stage virtual power plant results.

In one or more subsequent stages, the distribution controller 108 may re-execute the dispatch function during each subsequent stage, accounting for the virtual power plant results from a previous stage, to remove voltage deviations detected during the previous stage. For example, during a second stage immediately following the initial stage, the distribution controller 108 may re-execute the dispatch function, accounting for the initial-stage virtual power plant results, to remove voltage deviations detected during the initial stage. The distribution controller 108 may re-execute the dispatch function during a third stage, accounting for second-stage virtual power plant results determined from executing the dispatch function during the second stage, to remove voltage deviations detected during the second stage, and so forth.

The distribution controller 108 sends, to the sub-transmission controller 104, the virtual power plant capacity of the distribution system 106 as further coordination information that the sub-transmission controller 104 can use during a next operation interval in the sequence of operational intervals. The sub-transmission controller 104 uses the further coordination information, including the virtual power plant capacity, as constraints for executing the optimal power flow function during the next operational interval. The sub-transmission controller 104 applies the constraints to the optimal power flow function to determine a subsequent, optimal adjustment of the real and the reactive power received over connection 116 during the next operational interval, to again minimize loss, cost, or voltage deviations in view of other distribution systems that share connections with the sub-transmission system 102.

The coordination information exchanged between the sub-transmission controller 104 and the distribution controller 108, coupled with the sensitivity matrix based operational power flow function, provides various benefits to the sub-transmission system 102 and the distribution system 106. For example, co-optimization of distributed energy resource operations between the sub-transmission system 102 and the distribution system 106 prevents voltage problems that might otherwise propagate from the distribution system 106 and to the sub-transmission system 102. The distribution controller 108 can resolve voltage problems in a way that is transparent to the sub-transmission system 102 by deploying the distributed energy resources 112 to prevent operational issues in the distribution system 106. Further, the distribution controller 108 can rely on the sensitivity matrix to develop and maintain a unique dispatch strategy and price function for each of the different distributed energy resources 112 to further tailor how the distributed energy resources 112 are deployed to prevent operational issues in the distribution system 106. In addition, with input from the sub-transmission controller 104, the distribution controller 108 can coordinate among the different distributed energy resources 112 and the loads 114, including both customer-owned and utility-owned devices, to further tailor how the distributed energy resources 112 are deployed to prevent operational issues in the distribution system 106 from reaching the sub-transmission system 102.

Figure 2:
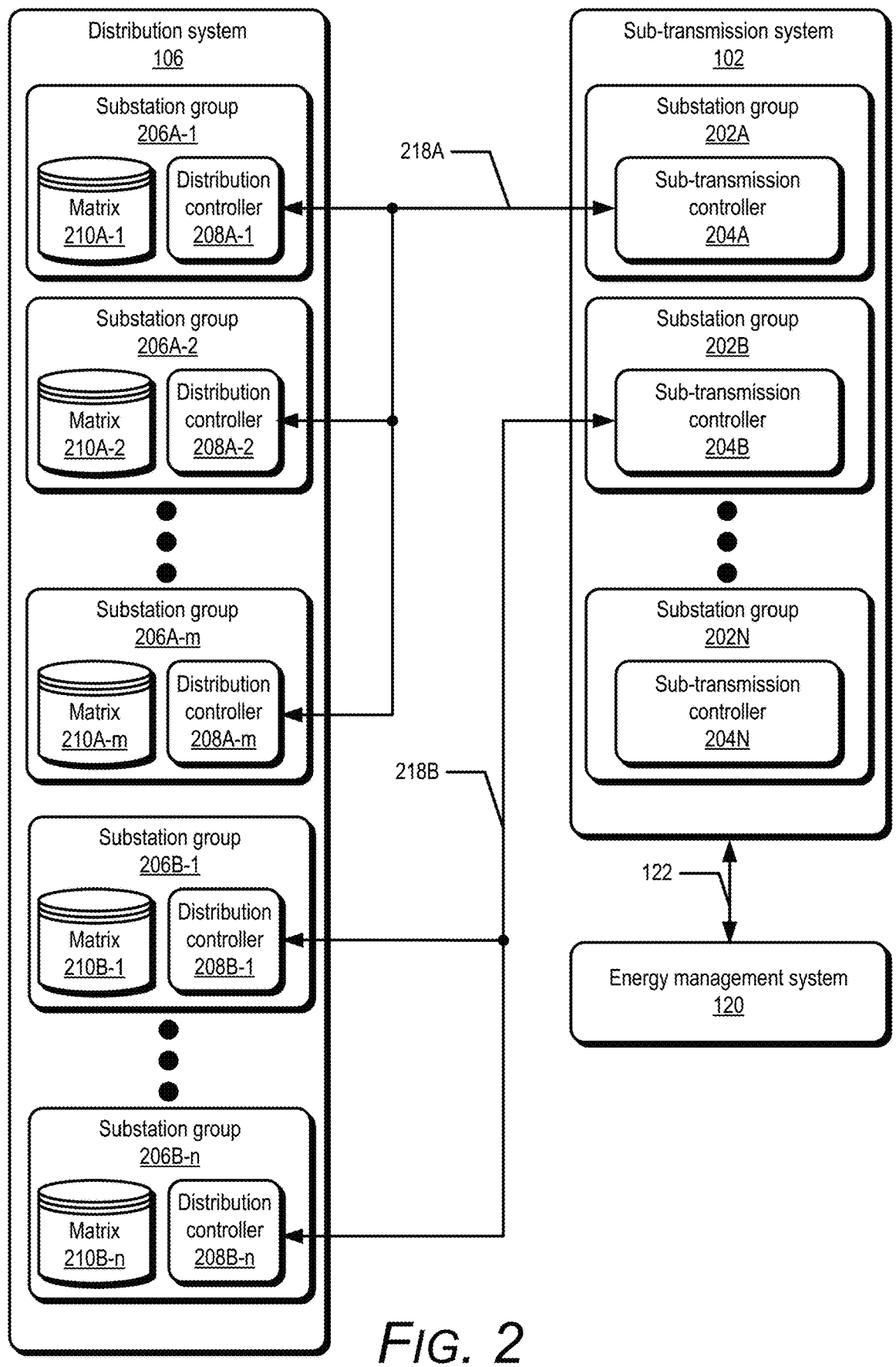
FIG. 2 is a conceptual diagram illustrating a control architecture associated with a sub-transmission system configured to coordinate volt-var control with a distribution system.

FIG. 2 is a conceptual diagram illustrating a control architecture associated with a sub-transmission system configured to coordinate volt-var control with a distribution system. As illustrated in FIG. 2, the sub-transmission system 102 may optionally be decomposed into multiple substation groups 202A through 202N (collectively referred to as "substation groups 202") and the distribution system 106 may optionally be decomposed into multiple substation groups 206A-1 through 206-A-m and substation groups 206B-1 through 206B-2 (collectively referred to as "substation groups 206"). Power system functions such as an AC optimal power flow function of a bulk power system can be computationally intensive tasks and become difficult to execute within limited operational time frames. The computational time required to run an AC optimal power flow function, for example, can increase exponentially as the size of a power system increases. The computational time for to execute the AC optimal power flow function for a subsystem can be less than the computational time required for solving the AC optimal power flow for the entire system. Optionally decomposing the sub-transmission system 102 and the distribution system 106 into substation groups 202 and substation groups 206 to perform coordinated volt-var control and optimization between subsets of the sub-transmission system 102 and the distribution system 106, can reduce overall complexity and computational requirements of the distribution system 106 and the sub-transmission system 102, particularly for larger distribution and sub-transmission systems.

Each of the substation groups 202 includes a respective sub-transmission controller, which is an example of the sub-transmission controller 104. For example, substation group 202A includes sub-transmission controller 204A, substation group 202B includes sub-transmission controller 204B, and substation group 202N includes sub-transmission controller 204N.

Each of the substation groups 206 includes a respective distribution controller, which is an example of the sub-transmission controller 104, and an associated sensitivity matrix. For instance, substation group 206A-1 includes distribution controller 208A-1 and sensitivity matrix 210A-1, substation group 206A-2 includes distribution controller 208A-2 and sensitivity matrix 210A-2, substation group 206A-m includes distribution controller 208A-m and sensitivity matrix 210A-m, substation group 206B-1 includes distribution controller 208B-1 and sensitivity matrix 210B-1, and substation group 206B-n includes distribution controller 208B-n and sensitivity matrix 210B-n.

The connections 218A and 218B form part of the connection 118 for exchanging coordination information, control signals, and other information between the distribution system 106 and the sub-transmission system 102. The sub-transmission controller 204A shares a connection 218A with each of the distribution controllers 208A-1, 208A-2, and 208A-m. The sub-transmission controller 204B shares a connection 218B with each of the distribution controllers 208B-1 and 208B-n.

The sub-transmission controller 204A may send, using the connection 218A, requirements (e.g., voltage, real/reactive power adjustment) of the substation group 202A to the distribution controllers 208A-1, 208A-2, and 208A-m. The distribution controllers 208A-1, 208A-2, and 208A-m can respond to the sub-transmission controller 204A over the connection 218 with respective limits (e.g., upper and lower bounds for real/reactive power adjustments) of the substation groups 206A-1, 206A-2, and 206A-m.

The distribution controllers 208B-1 and 208B-n can provide, to the sub-transmission controller 204B and over the connection 218, respective limits of the substation groups 206B-1 and 206B-n. The distribution controllers 208B-1 and 208B-n can provide the respective limits in response to the sub-transmission controller 204B sending, using the connection 218B, requirements of the substation group 202B to the distribution controllers 208B-1 and 208B-n.

For example, at the beginning of each operational interval, the distribution controller 208A-1 can determine, and send to the sub-transmission controller 204A, coordination information including: measurements, current settings, other operational limits of virtual power plants (e.g., the virtual power plant 110) associated with the substation group 206A-1, and operational status of grid-owned devices within the substation group 206A-1. The sub-transmission controller 204A may receive similar coordination information from the distribution controllers 208A-2 through 208A-m. Using the coordination information obtained via the connection 218A, the sub-transmission controller 204A may execute an optimal volt-var control function that considers the operational limits of the virtual power plants associated with the substation groups 206A-1 through 206A-m, and the operational status of grid-owned devices associated with the substation groups 206A-1 through 206A-m. The sub-transmission controller 204A may solve the optimal volt-var control function for each of the substation groups 206A-1 through 206A-m to determine respective requirements for each of the substation groups 206A-1 through 206A-m. The sub-transmission controller 204A sends the respective requirements (e.g., operational points) determined from solving the AC optimal power flow to each of the substation groups 206A-1 through 206A-m using the connection 218A. The sub-transmission controller 204B may perform similar operations to exchange coordination information with the substation groups 206B-1 through 206B-n. In addition to the coordination information mentioned above, the distribution controllers 208A-1 through 208A-m and 208B-1 through 208B-n may also receive the operation points of the distribution system 106 that the sub-transmission system 102 receives from the energy management system 120.

With the coordination information and operation points received over the connections 218A and 218B, the distribution controllers 208A-1 through 208A-m and 208B-1 through 208B-n can each execute a respective volt-var control function for each virtual power plant (e.g., the virtual power plant 110) within a respective substation group 206A-1 through 206A-m and 206B-1 through 206B-n. The respective volt-var control function is used to control the distributed energy resources 112 of the virtual power plant 110 in the distribution system 106 and including controlling the amount of reactive power determined by the sub-transmission controllers 204A and 204B. The distribution controllers 208A-1 through 208A-m and 208B-1 through 208B-n may each execute a respective volt-var control function that utilizes a respective sensitivity matrix 210A-1 through 210A-m and 210B-1 through 210B-n. The respective volt-var control function enables each of the distribution controllers 208A-1 through 208A-m and 208B-1 through 208B-n to achieve an optimal dispatch of the distributed energy resources 112, to achieve the operation points sent by the energy management system 120 while satisfying operational requirements and constraints of distribution system 106. Each volt-var control function can calculate upper and lower limits of real and reactive power of the virtual power plants (e.g., the virtual power plant 110) within a respective substation groups 206A-1 through 206A-m and 206B-1 through 206B-n.

In addition, each volt-var control function can forecast a subsequent real power operating point for the virtual power plants (e.g., the virtual power plant 110) within the respective substation groups 206A-1 through 206A-m and 206B-1 through 206B-n during subsequent operational interval. The distribution controllers 208A-1 through 208A-m and 208B-1 through 208B-n can send the determined subsequent real power operating points to the sub-transmission controllers 204A and 204B as coordination information that is exchanged via the connections 218A and 218B. The sub-transmission controllers 204A and 204B may share the coordination information with other controllers (e.g., the sub-transmission controller 204N) and the energy management system 120.

Thus, during a subsequent operational interval, the sub-transmission controllers 204A and 204B can optimize the real and reactive power operation set points of the virtual power plants (e.g., the virtual power plant 110) of the distribution system 106, can further determine real and reactive power operation set points of other devices within the sub-transmission system 102, e.g., for providing voltage support without violating the operational constraints of the distribution system 106 while honouring the real and reactive power limits of the distribution system 106.

The distribution controllers 208A-1 through 208A-m and 208B-1 through 208B-n may each execute a respective volt-var control function that utilizes a respective sensitivity matrix 210A-1 through 210A-m and 210B-1 through 210B-n. Each of the sensitivity matrices 210A-1 through 210A-m and 210B-1 through 210B-n may also be referred to as a voltage-load sensitivity matrix.

The distribution controllers 208A-1 through 208A-m and 208B-1 through 208B-n can each execute a two-stage hierarchical sensitivity matrix-based function for regulating the voltage at distribution feeders of the distribution system 106 while fulfilling virtual power plant requests from the sub-transmission system 102. The two-stage hierarchical sensitivity matrix-based function enables and facilitates coordinated operation and control between the transmission system 102 and the distribution system 106. It should be understood that the two-stage hierarchical sensitivity matrix-based function is just one of many ways for regulating the voltage at distribution feeders of the distribution system 106 while fulfilling virtual power plant requests from the sub-transmission system 102.

During a first stage, the distribution controller 208A-1 references the sensitivity matrix 210A-1 to dispatch available virtual power plant resources within the substation group 206A-1 to minimize voltage deviations within the distribution system 106, and at a lowest cost. In response to executing virtual power plant commands, the distribution controller 208A-1 conducts power-flow studies against current conditions of the substation group 206A-1 relative to acceptable limits defined by the sensitivity matrix 210A-1. For example, if the distribution controller 208A-1 detects voltage violations, the distribution controller 208A-1 executes a second-stage of the two-stage hierarchical sensitivity matrix based function to dispatch different, available virtual power plant resources within the substation group 206A-1 to remove the violations that occur during the first stage.

Following the second stage, the distribution controller 208A-1 determines upper and lower (maximum and minimum) virtual power plant limits of the substation group 206A-1 for a next operational interval. The distribution controller 208A-1 sends the upper and lower virtual power plant limits to the sub-transmission controller 204A as coordination information. The sub-transmission controller 204A can use the virtual power plant limits as operational constraints for controlling the substation group 202A and providing future virtual power plant commands to the distribution system 106.

Each of the sensitivity matrices 210A-1 through 210A-m and 210B-1 through 210B-n includes two parts, a part for real power and a part for reactive power. In the following, $VLSM_P$ and $VLSM_Q$ are defined as the sensitivity matrices for real power and reactive power, respectively. The voltage change, $\delta V_i$, at node i can be estimated by the real power change, $\delta P_j$, and the reactive power change, $\delta Q_1$, at all nodes (i.e., j=1 ... n) using the $VLSM_P$ and $VLSM_Q$ as follows.

$$|\delta V| = |VLSM_P||\delta P| + |VLSM_Q||\delta Q| \quad (1)$$

i.e., $$\begin{vmatrix} \delta V(1) \\ \delta V(2) \\ \vdots \\ \delta V(n) \end{vmatrix} = \begin{vmatrix} p_{11} & p_{12} & \cdots & p_{1n} \\ p_{21} & \ddots & & p_{2n} \\ \vdots & & \ddots & \vdots \\ p_{n1} & p_{n2} & & p_{nn} \end{vmatrix} \begin{vmatrix} \delta P_1 \\ \delta P_2 \\ \vdots \\ \delta P_n \end{vmatrix} + \begin{vmatrix} q_{11} & q_{12} & \cdots & q_{1n} \\ q_{21} & \ddots & & q_{2n} \\ \vdots & & \ddots & \vdots \\ q_{n1} & q_{n2} & & q_{nn} \end{vmatrix} \begin{vmatrix} \delta Q_1 \\ \delta Q_2 \\ \vdots \\ \delta Q_n \end{vmatrix} \quad (2)$$

From (2), (3) can be derived:

$$\delta V(i) = \sum_{j=1}^{n} p_{ij}\delta P_j + \sum_{j=1}^{n} q_{ij}\delta Q_j \quad (3)$$

where $p_{ij}$ and $q_{ij}$ represent the real and reactive power sensitivity factors at bus i with respect to bus j.

The sensitivity factors represent the voltage change expected at bus i when the real and reactive power at bus j are perturbed by one unit. Function 1 describes the process of calculating $VLSM_P$. The calculation of $VLSM_Q$ is a similar process, in which the perturbation is done to the reactive power instead of to the real power at each load node.

To enhance the effectiveness of the sensitivity matrices 210A-1 through 210A-m and 210B-1 through 210B-n, the average voltage changes are calculated by conducting a time-series power flow study (i.e., t=1 ... $n_T$) and perturbing $P_i$ and $Q_i$ at each time step. Then, the process is repeated for several $\delta P$ and $\delta Q$. This process can determine an average of VLSMs as the final VLSM so that the sensitivity matrices 210A-1 through 210A-m and 210B-1 through 210B-n will reflect the voltage change at node i with respect to different $\delta P$ and $\delta Q$ at different P and Q. The $VLSM_P$ calculation is summarized in Function 1:

---

Function 1. $VLSM_P$ Calculation

1: Conduct a time-series power flow study using a typical load profile at each node, P(i, t) and Q(i, t), i = 1 ... n, t = 1 ... $n_T$.
2: Obtain the voltage at each bus at each time step: V(i, t), i = 1 ... n, t = 1 ... $n_T$.
3: Conduct the time-series power flow study again when P(1, t) is perturbed as $\tilde{P}(1, t) = P(1, t) + \delta P_1$, t = 1 ... $n_T$.
4: Calculate the new voltage at each bus at each time step: $\tilde{V}(i, t)$, i = 1 ... n, t = 1 ... $n_T$.
5: Calculate the sensitivity factor for each bus:

$$p_{i1} = \frac{\sum_{t=1}^{n_T}\tilde{V}(i,t) - \sum_{t=1}^{n_T}V(i,t)}{n_T \delta P_1}, i = 1 \ldots n, t = 1 \ldots n_T.$$

-continued

Function 1. VLSM$_P$ Calculation

6:      Repeat steps 1-5 for nodes 2-n.
7:      Obtain VLSM$_P^1$.
8:      Repeat steps 1-7 for $\delta P_2 \ldots \delta P_m$, to calculate VLSM$_P^1 \ldots$ VLSM$_P^m$.
9:      Calculate the final VLSM$_P$:

$$VLSM_P = \frac{\sum_{ii=1}^{m} VLSM_P^{ii}}{m}, ii = 1 \ldots m.$$

10:    End the VLSM$_P$ calculation.

The distribution controllers 208A-1 through 208A-m and 208B-1 through 208B-n can further rely on price functions for regulating the voltage at distribution feeders of the distribution system 106 while fulfilling virtual power plant requests from the sub-transmission system 102. For example, the distribution controllers 208A-1 through 208A-m and 208B-1 through 208B-n can further rely on the price functions to dispatch available virtual power plant resources within the substation groups 206A-1 through 206A-m and 206B-1 through 206B-n to minimize voltage deviations within the distribution system 106, and at a lowest cost.

The distribution controllers 208A-1 through 208A-m and 208B-1 through 208B-n may be configured to assume that a load aggregator of each of the substation groups 206A-1 through 206A-m and 206B-1 through 206B-n will be responsible for controlling the load-side resources to provide virtual power plant services and the distribution controllers 206A-1 through 206A-m and 206B-1 through 206B-n may be further configured to receive virtual power plant commands from the sub-transmission controllers 204A through 204N for determining virtual power plant requirements.

A load aggregator can maintain a voltage at each node in the distribution system 106 within operation limits. By enabling the distribution controllers 206A-1 through 206A-m and 206B-1 through 206B-n to achieve the virtual power plant requirements of the sub-transmission system 102, the load aggregator will be compensated. However, extra response (e.g., additional increase or decrease of load) will not be paid for and no payment will be made if the virtual power plant requirements are not fulfilled.

To prioritize different resources, the load aggregators rely on price functions. The price for capacitors, for example, may remain constant as capacitors are one-time switched-on or switched-off with a constant amount of reactive power support. Also, capacitors are manufactured with standardized capable switching times. The price of capacitors can therefore be set at a high-level to avoid frequent switching (and minimize loss). However, the price of controllable load response components and curtailment of other (e.g., photovoltaic) distributed energy resources may vary as conditions change.

A cost for curtailing distributed energy resources can be estimated as the cost to purchase an equivalent amount of power from the sub-transmission system 102. Because the efficiency of an inverter unit attached to a distributed energy resource will decrease with larger curtailments at lower power output, the price function applied to distributed energy resources considers the loss of energy caused by efficiency reductions. Generally, the price of distributed energy resource curtailment may be higher when the curtailment amount is larger and when the curtailment happens at lower power outputs. The distributed energy resource curtailment may be different at each node since each node has different conditions for output and the price function relied on by each of the load aggregators can account for the differences.

For example, the price function may decrease a price of a virtual power plant as an amount or size of the virtual power plant amount increases. That is, as the virtual power plant amount increases the quantity of distributed energy resources needed to achieve the required virtual power plant will be greater, and as such, the distributed energy resources recruited in the virtual power plant will be more diverse than if the virtual power plant amount were less. More distributed energy resources, with greater response capacity can be recruited and the price per kW response will therefore decrease. The price of a controllable load response will be the same for each node if one distribution feeder has a single load aggregator.

As such, the price functions of distributed energy resources and controllable loads are formulated in (4) and (5) accordingly. The parameters of the two price functions (4) and (5) can be determined based on specific market definitions such as a price of a voltage control service and a utility rate.

$$\lambda_{PV}^P(i) = -A_{PV} \cdot \ln(1 - x + \theta) + B_{PV}, x = 1 - \frac{P_{PV}(i) + P_{DR}^{PV}(i)}{S_{PV}(i)} \quad (4)$$

$$\lambda_{Load} = \frac{A_{Load}}{x + B_{Load}} + C_{Load}, x = \sum_{i=1}^{N} (P_{DR}^{Load}(i))^2 \quad (5)$$

The price of distributed energy resource curtailment is a function of the curtailed percentage, which is defined as x in (4). Because some distributed energy resources (e.g., photovoltaic distributed energy resources) can only be curtailed, a plus sign is used between $P_{PV}(i)$ and $P_{DR}^{PV}(i)$ because $P_{DR}^{PV}(i)$ is negative. The correction constant $\theta$ maybe a significantly small number that is used to guarantee that the price of distributed energy resource curtailment will be considerably high when distributed energy resource curtailment percentage is at or near maximum (e.g., 100%). The price of the controllable load response may be a function of the total load response amount on the feeder. Because load can be either reduced or increased, and the absolute response amount needs to be counted, a squared value can be used for convenience of solving the optimization problem.

As an example, the parameters used for (4) and (5) are shown in Table 1.

TABLE 1

Parameters for Price Functions

| $A_{PV}$ | $B_{PV}$ | $A_{Load}$ | $B_{Load}$ | $C_{Load}$ |
|---|---|---|---|---|
| 0.3186 | 0.7664 | 11 | 9 | 1 |

Figure 3:
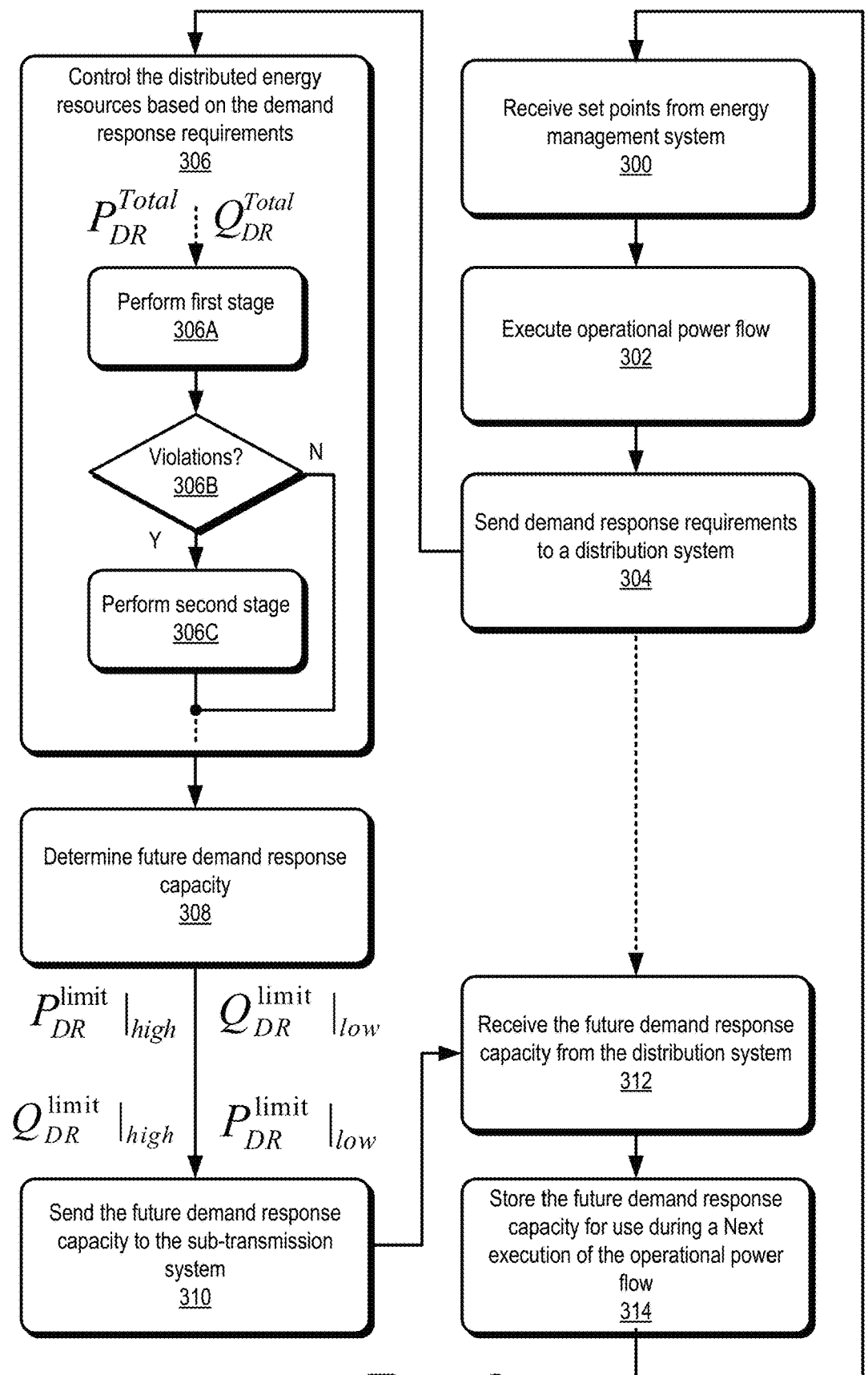
FIG. 3 is a flow-chart illustrating example operations performed by a sub-transmission system and a distribution system that are configured to coordinate volt-var control.

FIG. 3 is a flow-chart illustrating example operations performed by a sub-transmission system and a distribution system that are configured to coordinate volt-var control. FIG. 3 illustrates operations 300-314. Operations 300-314 may be performed in a different order, and may include additional, or fewer operations than what is illustrated in FIG. 3. FIG. 3 is described in the context of the sub-transmission controller 104 and the distribution controller 108, as illustrated in FIG. 1.

At 300, during an initial operational interval, the sub-transmission controller 104 receives operation set points established by the energy management system 120 for controlling the sub-transmission system 102. At 302, the sub-transmission controller 104 executes an operational power flow function to determine virtual power plant requirements to pass to the distribution system 106, that meet the operation set points received from the energy management system 120. At 304, the sub-transmission controller sends the virtual power plant requirements (as an example of coordination information) to the distribution system 106.

At 306, the distribution controller 108 controls the distributed energy resources 112, the loads 114, and other components (e.g., switchable capacitors, switchable shunts, other power distribution devices) according to the virtual power plant requirements received from the transmission system 102. The distribution controller 108 may control the components of the distribution system 106, based on the virtual power plant requirements received from the transmission system 102, using a multi-stage control process to minimize voltage problems that can otherwise occur when integrating the distributed energy resources 114 within the distribution system 106.

At 308, the distribution controller 108 determines future virtual power plant capacity associated with the distributed energy resources 112, the loads 114, and the other components of the distribution system 106. At 310, the distribution controller 108 sends coordination information to the sub-transmission controller 104, which includes the future virtual power plant capacity associated with the distributed energy resources 112, the loads 114, and the other components of the distribution system 106.

At 312, the sub-transmission controller 104 receives the future virtual power plant capacity, and in some cases other coordination information, from the distribution controller 108. At 314, the sub-transmission controller 104 stores the future virtual power plant capacity for use during a next execution of the operational power flow at 302. The sub-transmission controller 104 can repeat operations 300 through 314 to direct the distribution system 106 to determine subsequent virtual power plant requirements to pass to the distribution system 106, that meet the operation set points received from the energy management system 120 during subsequent operational intervals. The distribution controller 108 can repeat operations 306 through 310 to control the distribution system 106 to achieve subsequent virtual power plant requirements received from the sub-transmission controller 104, that meet the operation set points received from the energy management system 120 during subsequent operational intervals.

At 302 the sub-transmission controller 104 may execute an operational power flow function to determine optimal, virtual power plant requirements to pass to the distribution system 106, that meet the operation set points received from the energy management system 120. Unlike a classical AC operational power flow function, where the objective may be to minimize fuel costs associated with generators, the sub-transmission controller 104 may execute an operational power flow optimal volt-var control function that minimizes sum voltage deviations of: target load buses, total system losses, and curtailments of distributed energy resource, real power output. The operational power flow optimal volt-var control function further aims to utilize virtual power plant resources and mechanical-switching of shunt elements, while maintaining sub-transmission voltage levels, lines, and transformer flows within certain boundaries, by finding the optimal settings of different reactive power control devices in the sub-transmission system 102 and the virtual power plants (e.g., the virtual power plant 110) in the distribution system 106.

The total system loss can be quantified by:

$$\min f_1 = \sum_{(i,j,c)\in E} \frac{b_{ijc}}{b_{ijc}^2 + g_{ijc}^2}\left(\left(I_{ijc}^R + \frac{b_{ijc}^C V_i^I}{2}\right)^2 + \left(I_{ijc}^I - \frac{b_{ijc}^C V_i^R}{2}\right)^2\right) \quad (61)$$

The sum of the voltage deviations of target load buses from their bus voltage set points are:

$$\min f_2 = \begin{cases} \sum_{i\in L}\left(\sqrt{(V_i^R)^2 + (V_i^I)^2} - v_i^{set}\right)^2 & (7) \\ \quad \text{if } \sqrt{(V_i^R)^2 + (V_i^I)^2} > v_i^{set} + v_{db} \\ \quad \text{or } \sqrt{(V_i^R)^2 + (V_i^I)^2} < v_i^{set} - v_{db} \\ 0 & o\cdot w \end{cases}$$

In (2), $v_{db}$ is the tolerance for target load buses voltage range.

The objective function for penalizing mechanical switching of shunt elements is formulated as:

$$\min f_3 = \sum_{i\in S}\sum_{k\in K_i} |x_{ik} - x_{ik}^*| \quad (8)$$

The objective function for penalizing the use of virtual power plant resources is formulated as:

$$\min f_4 = \sum_{i\in P} Q_i^{DR} \quad (9)$$

At last, the objective function for penalizing the use of demand energy resource real power curtailment is formulated as:

$$\min f_5 = \sum_{i\in P} P_i^c \quad (10)$$

The constraints can be summarised as:

$$I_{ijc}^R = \frac{1}{\tau_{ijc}^2}\left(g_{ijc}V_i^R - \left(b_{ijc} + \frac{b_{ijc}^C}{2}\right)V_i^I\right) - \quad (11)$$
$$\frac{1}{\tau_{ijc}}(g_{ijc}V_j^R - b_{ijc}V_j^I)\cos(\phi_{ijc}) + \frac{1}{\tau_{ijc}}(g_{ijc}V_j^I + b_{ijc}V_j^R)\sin(\phi_{ijc})$$

$$I_{ijc}^I = \frac{1}{\tau_{ijc}^2}\left(g_{ijc}V_i^I + \left(b_{ijc} + \frac{b_{ijc}^C}{2}\right)V_i^R\right) - \quad (12)$$
$$\frac{1}{\tau_{ijc}}(g_{ijc}V_j^I + b_{ijc}V_j^R)\cos(\phi_{ijc}) - \frac{1}{\tau_{ijc}}(g_{ijc}V_i^R - b_{ijc}V_i^I)\sin(\phi_{ijc})$$

-continued $$0 = \sum_{m \in G_i} P_m^g - d_i^P + (P_i^s - P_i^c) - V_i^R \left( \sum_{(jc):ijc \in s} I_{ijc}^R + \sum_{(jc):jic \in s} I_{ijc}^R \right) - \quad (13)$$

$$V_i^I \left( \sum_{(jc):ijc \in s} I_{ijc}^I + \sum_{(jc):jic \in s} I_{ijc}^I \right) - \left( (V_i^R)^2 + (V_i^I)^2 \right) g_i^s$$

$$0 = \sum_{m \in G_i} Q_m^g - d_i^Q + Q_i^s - \quad (14)$$

$$V_i^R \left( \sum_{(jc):ijc \in s} I_{ijc}^I + \sum_{(jc):jic \in s} I_{ijc}^I \right) - V_i^I \left( \sum_{(jc):ijc \in s} I_{ijc}^R + \sum_{(jc):jic \in s} I_{ijc}^R \right) +$$

$$Q_i^{DR} + \left( b_i^s + \sum_{k \in K_i} b^{\Delta ik} x_{ik} \right) \left( (V_i^R)^2 + (V_i^I)^2 \right)$$

$$\underline{V}_i^2 \leq (V_i^R)^2 + (V_i^I)^2 \leq \overline{V}_i^2 \quad (15)$$

$$\left( (I_{ijc}^R)^2 + (I_{ijc}^i)^2 \right) \leq \overline{I}_{ijcap}^2 \quad (16)$$

$$P_m^g = p_m^{sch} \quad (17)$$

$$Q_m^{min} \leq Q_m^g \leq Q_m^{max} \quad (18)$$

$$0 \leq P_i^c \leq P_i^{Cmax} \quad (19)$$

$$Q_i^{Smin} \leq Q_i^s \leq Q_i^{Smax} \quad (20)$$

$$Q_i^{DRmin} \leq Q_i^{DR} \leq Q_i^{DRmax} \quad (21)$$

$$V_m^g = v_m^{sch} \quad (22)$$

$$0 \leq x_{ik} \leq x_{ik}^{max} \quad (23)$$

Constraints (11) and (12) represent the real and imaginary parts of the current flowing through the line from bus i to bus j. Constraints (11) and (12) are based on rectangular current-voltage formulation. Constraints (13) and (14) represent the real and reactive power balance at bus i. Constraints (15) and (16) represent the lower and upper bounds of voltage with $\underline{V}_i=0.9$, $\overline{V}_i=1.1$ and current magnitudes for each bus and each transmission line. Constraints (17) and (18) represent the requirements for the real and reactive power output from the generator at bus i. In the operational power flow optimal volt-var control function, the generation dispatch in constraint (17) may remain constant as the day-ahead commitment (e.g., due to real-time markets, in which most generators can deliver real power based on the day-ahead market bidding results, except for a few generators under automatic generation control). Constraints (19) and (20) represent the lower and upper bounds for real and reactive of aggregated distributed energy resource (e.g., solar) power at bus i. Similarly, constraint (21) represents the lower and upper bounds for aggregated virtual power plant at bus i. At the sub-transmission level, the operational power flow optimal volt-var control function optimizes virtual power plant and other sub-transmission var compensation devices for volt-var control considering the virtual power plant model and constraints by achieving the bounds of the virtual power plant submitted by the virtual power plants (e.g., the virtual power plant 110). Constraint (22) requires the generation voltage to remain the same as the scheduled generator voltage set point. Constraint (23) represents the bounds for switched shunt elements, in which $x_{ik}^{max}$ is the number of steps in block k.

The multi-objective optimization can be transformed into a single objective function by using a weighted sum that aggregates the objective values to a single quality measure. However, the objective functions in (6) to (10) are represented by various measure units, so they may need to be normalized. Normalization can be done by calculating the normalized objective functions:

$$f_n^{norm} = \frac{\max(f_n) - f_n}{\max(f_n) - \min(f_n)} \quad (24)$$

For the normalized objective functions calculated in (24), a weight $w_n$ can to be chosen for each objective. The final single objective function for the proposed volt-var control function is formulated as:

$$\min \sum_{n=1}^{5} w_n f_n^{norm} \quad (25)$$

The sub-transmission controllers 204A through 204N can optimize virtual power plants (e.g., the virtual power plant 110) of the distributions system 106 for voltage support considering the above constraints by achieving the limits of real and reactive power of the virtual power plants. Limits defined in constraints (18)-(20) and forecasted by distributed energy resource power generation $P_i^s$ are sent by the virtual power plants (e.g., the virtual power plant 110), within which the respective dispatch functions at the virtual power plants of distribution system 106 can satisfy constraints at a distribution system 106. After the optimal volt-var control function is solved at the sub-transmission level by the sub-transmission controllers 204, the optimal solution for aggregated virtual power plant requirement $Q_i^{DR}$ and aggregated reactive power support requirement $Q_i^s$ can be sent back to the virtual power plants (e.g., the virtual power plant 110) such that the distribution system 106 can disaggregate requirements of the energy management system 120 to each appliance level consumer, while satisfying constraints and voltage requirements at the distribution system 106. Therefore, the energy management system 120 can optimize the virtual power plant 110 and other sub-transmission var compensation devices of the distribution system 106 for volt-var support without necessarily considering the constraints at the distribution system 106.

At 302, when executing the operational power flow function to determine optimal, virtual power plant requirements to pass to the distribution system 106, that meet the operation set points received from the energy management system 120, the sub-transmission controller 104 may rely on a distributed energy resource (e.g., photovoltaic) inverter model for determining active and reactive power dispatch requirements for the distribution system 106. Based on a detailed understanding of thermal handling capability of a distributed energy resource inverter associated with the distributed energy resources 112 of the virtual power plant 110, the sub-transmission controller may determine maximum allowable losses in power electronic devices of the distribution system 106, including maximum allowable losses in insulated-gate bipolar transistors (IGBT) and diodes integrated with the power electronic devices of the distribution system 106. Based on the maximum allowable losses, the sub-transmission controller can determine a corresponding, maximum allowed P and Q. In some cases, an IGBT may limit the maximum P of a typical inverter, and a diode may limit the maximum Q rating of the typical inverter. This result is summarised in a new constraint equation given below:

$$\frac{(P_i^s)^2}{S_i^2} + \frac{(Q_i^s)^2}{k^2 S_i^2} \leq 1 \qquad (26)$$

In (26), k equals approximately 1.1 for a typical inverter for a photovoltaic type distributed energy resource. This new and improved constraint may effectively increase the allowable Q output by twenty percent for a given P output. For example, during low light conditions (e.g., night-time) when P for a photovoltaic type distributed energy resource equals zero, reactive power injection results in additional power losses to the distribution system 106, which can become an economic constraint.

In addition to the reactive power support from an inverter, the sub-transmission controller 104 may include another important smart feature within the inverter model. Referred to as the active power curtailment $P_i^c$ of a distributed energy resource, the equation for the active power curtailment $P_i^c$ constraint is:

$$\frac{(P_i^s - P_i^c)^2}{S_i^2} + \frac{(Q_i^s)^2}{k^2 S_i^2} \leq 1 \qquad (27)$$

Although some power from the inverter may be wasted when the active power curtailment is considered, the active power curtailment can reduce voltage problems, particularly when power generation from a corresponding distributed energy resource is high and the demand from the distributed energy resource is low. When significant reactive support or absorption is required, the real power outputs from the distributed energy resources may reach a maximum level, and the capability of a distributed energy resource inverter to provide reactive power support can be reduced due to limitations in handling thermal overloads, as described in equation (27).

Integration of distributed energy resources into medium-voltage and low-voltage networks changes load profiles along distribution grids, causing reverse power flow in distribution systems. The injection of active and reactive power may cause voltage to increase locally within the distribution system 106, leading to violations of overvoltage operational limits, and may cause distortion of the voltage regulation devices within the distribution system 106, as well. Therefore, after virtual power plant commands are send from the sub-transmission controller 104, the distribution controller 108 may need to dispatch the available distributed energy resources 112 on in the distribution system 106, with an objective to regulate voltage profiles within the distribution system 106 at the lowest cost.

At 304, the sub-transmission controller 104 sends virtual power plant requirements (e.g., $P_{DR}^{Total}$ and $Q_{DR}^{Total}$) for each controllable bus in the transmission network, including the distribution system 106. At 306, the distribution controller 108 may execute a two-stage, virtual power plant control strategy including by performing operations 306A through 306C. After the two-stage control is finished, the virtual power plant constraints $P_{DR}^{limit}|_{high}$, $P_{DR}^{limit}|_{low}$, $Q_{DR}^{limit}|_{high}$, and $Q_{DR}^{limit}|_{low}$ are calculated and at 310, the virtual power plant constraints $P_{DR}^{limit}|_{high}$, $P_{DR}^{limit}|_{low}$, $Q_{DR}^{limit}|_{high}$, and $Q_{DR}^{limit}|_{low}$ are sent back to the sub-transmission controller 104 for controlling the sub-transmission 102 and the distribution system 106 during the next operation interval.

At 306A, in response to receiving $P_{DR}^{Total}$ and $Q_{DR}^{Total}$, the distribution controller 108 initiates a first stage for virtual power plant. In the first stage, the constraints on nodal voltage limits is relaxed for all load nodes on a feeder. After the first stage, at 306B, voltage at each node is checked for violations. If no voltage violation are detected, the distribution controller moves on to determine future virtual power plant capacity at 308. However, if at 306B, voltage violations are detected, the distribution controller 108 executes a second stage to eliminate the voltage violations. Because voltage violations may be rare events that happen infrequently, ignoring nodal voltage upper and lower limits at 306A during the first stage, can improve computational efficiency enabling the distribution controller 108 to solve the optimization problem quickly.

At 306A, the distribution controller 308 disaggregates the virtual power plant requirements from the sub-transmission controller 104 to determine corresponding nodes such that the virtual power plant cost and the overall voltage deviation are minimized. The distribution controller 108 may assumed that 1) the real power requirement $P_{DR}^{Total}$ will be fulfilled by curtailing distributed energy resources or switching on or switching off controllable loads 114. The distribution controller 108 may further assume that 2) the reactive power requirement $Q_{DR}^{Total}$ will be fulfilled by smart inverters and capacitors of the distribution system 106 and that 3) the distributed energy resource output can be curtailed but not increased, and the controllable load cannot provide reactive power response. With these assumptions, the distribution controller 108 may determine:

$$\min Z_1 = \varpi_1 \xi C_1 + \varpi_2 \Delta V \qquad (28)$$

where $$C_1 = C_{PV} + C_{Load} + C_{Cap} \qquad (29)$$

$$C_{PV} = \sum_{i=1}^{N} \left( \lambda_{PV}^P(i) \cdot (P_{DR}^{PV}(i))^2 \right) + \lambda_{PV}^Q \sum_{i=1}^{N} (Q_{DR}^{PV}(i))^2 \qquad (30)$$

$$C_{Load} = \lambda_{Load} \sum_{i=1}^{N} (P_{DR}^{Load}(i))^2 \qquad (31)$$

$$C_{Cap} = \lambda_{Cap} \sum_{i=1}^{N} (s(i)(Q_{Cap}(i))^2) \qquad (32)$$

$$\lambda_{PV}^P(i) = -A_{PV} \cdot \ln\left( \frac{P_{PV}(i) + P_{DR}^{PV}(i)}{S_{PV}(i)} \right) + B_{PV} \qquad (33)$$

$$\lambda_{Load} = \frac{A_{Load}}{\sum_{i=1}^{N} (P_{DR}^{Load}(i))^2 + B_{Load}} + C_{Load} \qquad (34)$$

$$\Delta V = \sum_{i=1}^{N} (V_1(i) - V_{obj})^2 \qquad (35)$$

$$V_1(i) = V_0(i) + \sum_{j=1}^{N} (VLSM_P(i,j) \cdot (P_{DR}^{Load}(j) - P_{DR}^{PV}(j))) + \qquad (36)$$

$$\sum_{j=1}^{N} (VLSM_Q(i,j) \cdot (Q_{DR}^{PV}(j) + s(j) \cdot Q_{Cap}(j)))$$

subject to $$0 < \varpi_1, \varpi_2 < 1 \qquad (37)$$

$$\varpi_1 + \varpi_2 = 1 \qquad (38)$$

-continued $$s(i) = 0, 1, s(j) = 0, 1 \quad (39)$$

$$-P_{DR}^{PV}|_{max}(i) < P_{DR}^{PV}(i) < 0 \quad (40)$$

$$P_{DR}^{Load}|_{max}^{down}(i) < P_{DR}^{Load}(i) < P_{DR}^{Load}|_{max}^{up}(i) \quad (41)$$

$$-Q_{DR}^{PV}|_{max}(i) < Q_{DR}^{PV}|_2(i) < Q_{DR}^{PV}|_{max}(i) \quad (42)$$

$$Q_{DR}^{PV}|_{max}(i) = S_{PV}(i)\sqrt{(1 - (P_{PV}(i)/S_{PV}(i))^2)k^2} \quad (43)$$

$$-\sum_{i=1}^{N} P_{DR}^{PV}(i) + \sum_{i=1}^{N} P_{DR}^{Load}(i) = P_{DR}^{Total} \quad (44)$$

$$\sum_{i=1}^{N} Q_{DR}^{PV}(i) + \sum_{i=1}^{N} s(i)Q_{Cap}(i) = Q_{DR}^{Total} \quad (45)$$

Because $C_1$ and $\Delta V$ are not of the same order of magnitude, ($C_1$ is usually very large, but $\Delta V$ is usually very small), the distribution controller 108 may apply a correction coefficient $\xi$ to narrow the gap between $C_1$ and $\Delta V$ so that the optimization can be emphasized equally for $C_1$ and $\Delta V$ when the weight coefficients $\overline{\omega}_1$ and $\overline{\omega}_2$ are equal. Then, by adjusting $\overline{\omega}_1$ and $\overline{\omega}_2$, the distribution controller 108 can adjust the weights between minimizing the total cost and minimizing the total voltage deviation. To make this mixed-integer, nonlinear programming problem solvable, the distribution controller 108 may use the squares of the decision variables instead of the absolute values, while when calculating actual cost, the distribution controller 108 may use the absolute values.

After solving (28) to (45), the optimal $P_{DR}^{PV}$, $P_{DR}^{Load}$, and $Q_{DR}^{PV}$ for each node will be obtained, as well as the "on" and "off" status of the capacitor bank, s(i).

At 306C, the distribution controller 108 minimizes the virtual power plant cost and the total virtual power plant amount while eliminating voltage violations in the distribution system 106. The second-stage optimization performed at 306C may be triggered when voltage violations are detected at 306B in power flow results after the virtual power plant requirements have been executed at 306A. Controllable loads and smart inverters may be used within the distribution system 106 for providing virtual power plant capability at 306C, in the second stage. Capacitors may not be used at 306C because switching capacitors on and off can create a large voltage change along the distribution feeder; in other words, capacitors may not be as flexible as the controllable loads and smart inverters. With these assumptions, the distribution controller 108 may determine:

$$\min Z_2 = \overline{\omega}_3 \xi C_2 + \overline{\omega}_4 P_{DR}^{Total}|_2 + \overline{\omega}_5 Q_{DR}^{Total}|_2 \quad (46)$$

$$C_2 = \lambda_{Load} \sum_{i=1}^{N} (P_{DR}^{Load}|_2(i))^2 + \quad (47)$$

$$\sum_{i=1}^{N} \lambda_{PV}^{P}(i) \cdot (P_{DR}^{PV}|_2(i))^2 + \lambda_{PV}^{Q} \sum_{i=1}^{N} (Q_{DR}^{PV}|_2(i))^2$$

$$P_{DR}^{Total}|_2 = \sum_{i=1}^{N} (P_{DR}^{Load}|_2(i) - P_{DR}^{PV}|_2(i))^2 \quad (48)$$

$$Q_{DR}^{Total}|_2 = \sum_{i=1}^{N} (Q_{DR}^{PV}|_2(i))^2 \quad (49)$$

subject to

-continued $$0 < \overline{\omega}_3, \overline{\omega}_4, \overline{\omega}_5 < 1 \quad (50)$$

$$\overline{\omega}_3 + \overline{\omega}_4 + \overline{\omega}_5 = 1 \quad (51)$$

$$-P_{DR}^{PV}|_{max}(i) < P_{DR}^{PV}|_2(i) < 0 \quad (52)$$

$$P_{DR}^{Load}|_{max}^{down}(i) < P_{DR}^{Load}|_2(i) < P_{DR}^{Load}|_{max}^{up}(i) \quad (53)$$

$$-Q_{DR}^{PV}|_{max}(i) < Q_{DR}^{PV}|_2(i) < Q_{DR}^{PV}|_{max}(i) \quad (54)$$

$$Q_{DR}^{PV}|_{max}(i) = S_{PV}(i)\sqrt{(1 - (P_{PV}(i)/S_{PV}(i))^2)k^2} \quad (55)$$

$$V_2(i) = V_1(i) + \sum_{j=1}^{N} VLSM_P(i,j) \cdot (P_{DR}^{Load}(j) - P_{DR}^{PV}(j)) + \quad (56)$$

$$\sum_{j=1}^{N} VLSM_Q(i,j) \cdot (Q_{DR}^{PV}(j) + s(j) \cdot Q_{Cap}(j))$$

$$V_{limit}^{low} < V_2(i) < V_{limit}^{high} \quad (57)$$

Because the accomplished rate for the required transmission virtual power plant may need to be maintained as high as possible, the amount of virtual power plant required to eliminate the voltage violations may need to be minimized. Therefore, $\overline{\omega}_4$ and $\overline{\omega}_5$ can set to be much larger than $\overline{\omega}_3$.

As shown in (56) and (57), the voltage after second-stage control will be constrained in a defined range. The low and high limits of the range can be adjusted as needed. Usually the range will be [0.95, 1.05].

Function 2, shown below, represents a control function for the two-stage optimization scheme illustrated as operation 306. After receiving the virtual power plant requirements from the sub-transmission controller 104, the first-stage optimization control will be performed at 306A; then the required response will be implemented at the feeder, and power flow will be performed. At 306B, the voltage at each node will be checked to examine whether any node voltage violates the limitation. If any violation are detected at 306B, the second stage will be performed at 306C to eliminate the violations. Then, at 308, the virtual power plant (VPP) constraints for the transmission system at the next time step will be generated.

Function 2. Two-Stage Control Function

1: Receive VPP requirement from transmission system controller: $P_{DR}^{Total}$ and $Q_{DR}^{Total}$
2: Perform first-stage optimization control: solve problem formulated in (6-22), obtain $P_{DR}^{Load}(i)$, $P_{DR}^{PV}(i)$, $Q_{DR}^{PV}(i)$, and s(i)
3: Implement $P_{DR}^{Load}(i)$, $P_{DR}^{PV}(i)$, $Q_{DR}^{PV}(i)$, and s(i) at the feeder
4: Run power flow simulation for the feeder
5: Voltage violation check
6: if any voltage violation detected then
7: Perform second-stage optimization control: solve problem formulated in (45-55), obtain $P_{DR}^{Load}|_2(i)$, $P_{DR}^{PV}|_2(i)$, and $Q_{DR}^{PV}|_2(i)$
8: Implement $P_{DR}^{Load}|_2(i)$, $P_{DR}^{PV}|_2(i)$, and $Q_{DR}^{PV}|_2(i)$ at the feeder
9: Run power flow simulation for the feeder
10: Go to 5
11: else
12: End and exit the whole function
13: end if
14: Use (56-61) to generate constraints for transmission system for the next time step: $P_{DR}^{limit}|_{high}$, $P_{DR}^{limit}|_{low}$, $Q_{DR}^{limit}|_{high}$, and $Q_{DR}^{limit}|_{low}$ At 308, (e.g., after performing the second stage at 306C), the distribution controller 108 determines electricity consumption and distributed energy resource generation for a next operation interval. The distribution controller 108 calculates the real and reactive power increase and decrease limits, $P_{DR}^{limit}|_{high}$, $P_{DR}^{limit}|_{low}$, $Q_{DR}^{limit}|_{high}$, and $Q_{DR}^{limit}|_{low}$ (also referred to as future demand response capacity) and serve as operational constraints of the distribution system 106. At 310, the distribution controller 108 sends the real and reactive power increase and decrease limits, $P_{DR}^{limit}|_{high}$, $P_{DR}^{limit}|_{low}$, $Q_{DR}^{limit}|_{high}$, and $Q_{DR}^{limit}|_{low}$ to the sub-transmission controller 104 for conducting transmission-level optimization during a next operation interval.

The real power constraints $P_{DR}^{limit}|_{high}$ and $P_{DR}^{limit}|_{low}$ can be calculated based on the available controllable load resources and the distributed energy resource curtailment capability, as shown in (58) and (59):

$$P_{DR}^{limit}|_{high} = \sum_{j=1}^{N_{APP}} f_j^{up}(x_1, x_2, \ldots) \cdot N_{House} \cdot P_{APP}^{Rate}(j) + r_{PV}^P \cdot \bar{P}_{PV}^{Total} \tag{58}$$

$$P_{DR}^{limit}|_{low} = \sum_{j=1}^{N_{APP}} f_j^{down}(x_1, x_2, \ldots) \cdot N_{House} \cdot P_{APP}^{Rate}(j) \tag{59}$$

In (58) and (59), $r_{PV}^P$ is the ratio of the available real power of distributed energy resources for curtailment, and $x_1$, $x_2$, ... are the parameters of controllable devices (e.g., appliances) used for the device-on-off probability estimation functions $f_j^{up}(x_1, x_2, \ldots)$ and $f_j^{down}(x_1, x_2, \ldots)$. For example, if controllable appliances are air conditioners, $x_1$, $x_2$, ... may be a measured outside temperature and an average air conditioner set point. When the outdoor temperature is high and the average set point is low, the air conditioners are more likely to be "on." Therefore, they are more likely to be available for providing load reduction, i.e., $f_j^{down}(x_1, x_2, \ldots)$ is greater than $f_j^{up}(x_1, x_2, \ldots)$. In this example, $f_j^{down}$ for air conditioners is formulated as a gamma distribution, as shown in (38). The probability density function is plotted in FIG. 4. $f_j^{up}$ and is equal to one minus $f_j^{down}$, as shown in (60) and (61):

$$f_j^{down}(x) = \frac{1}{\beta^\alpha \Gamma(\alpha)} x^{\alpha-1} e^{\frac{-x}{\beta}} \tag{60}$$

where
$x = 5/(T_{out} - T_{set})$, $\alpha = 1$, $\beta = 1$ $$f_j^{up} = 1 - f_j^{down} \tag{61}$$

Figure 4:
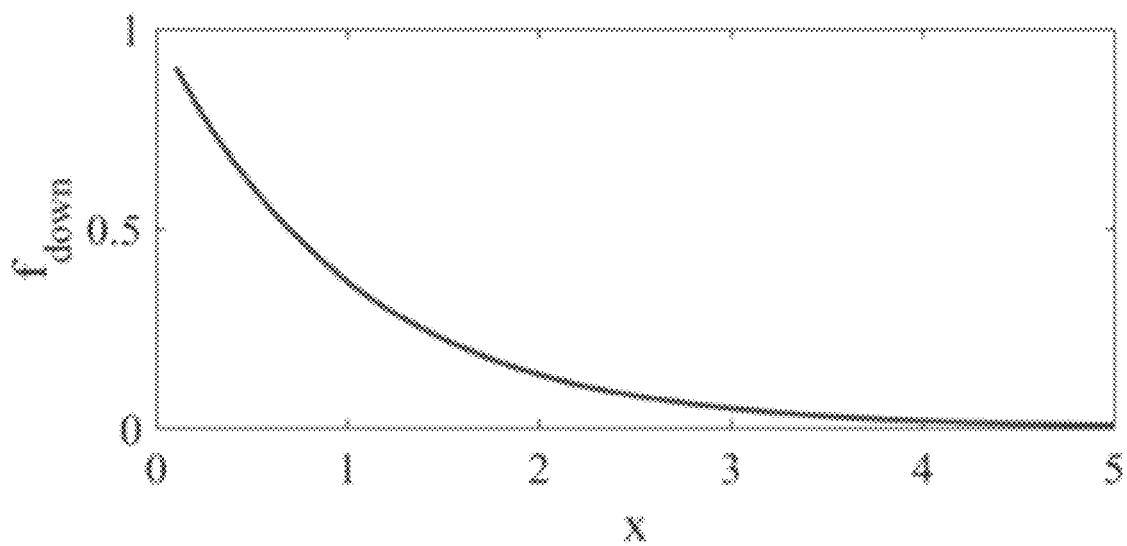
FIG. 4 is a probability density function of $f_j^{down}$.

If some air conditioners have moved their set points up to provide the load reduction service in the current operational interval, the average $T_{set}$ will increase, so the x will be greater. Subsequently, $f_j^{down}$ for the next operational interval will be lower, as shown in FIG. 4.

The reactive power limits are calculated in (62) and (63) where $r_{PV}^Q$ is the fraction of the distributed energy resource relative to reactive power available for virtual power plant. The reactive power constraints are calculated based on a smart inverter operation equation (23) and the available capacitors of the distribution system 106.

$$Q_{DR}^{limit}|_{high} = \tag{62}$$
$$\sum_{i=1}^{N} r_{PV}^Q S_{PV}(i) \sqrt{\left(1 - (P_{PV}(i)/S_{PV}(i))^2\right) k^2} + \sum_{i=1}^{N} Q_{cap}(i) \text{ if } s(i) = 0$$

$$Q_{DR}^{limit}|_{low} = \tag{63}$$
$$\sum_{i=1}^{N} r_{PV}^Q S_{PV}(i) \sqrt{\left(1 - (P_{PV}(i)/S_{PV}(i))^2\right) k^2} + \sum_{i=1}^{N} Q_{cap}(i) \text{ if } s(i) = 1$$

Figure 5:
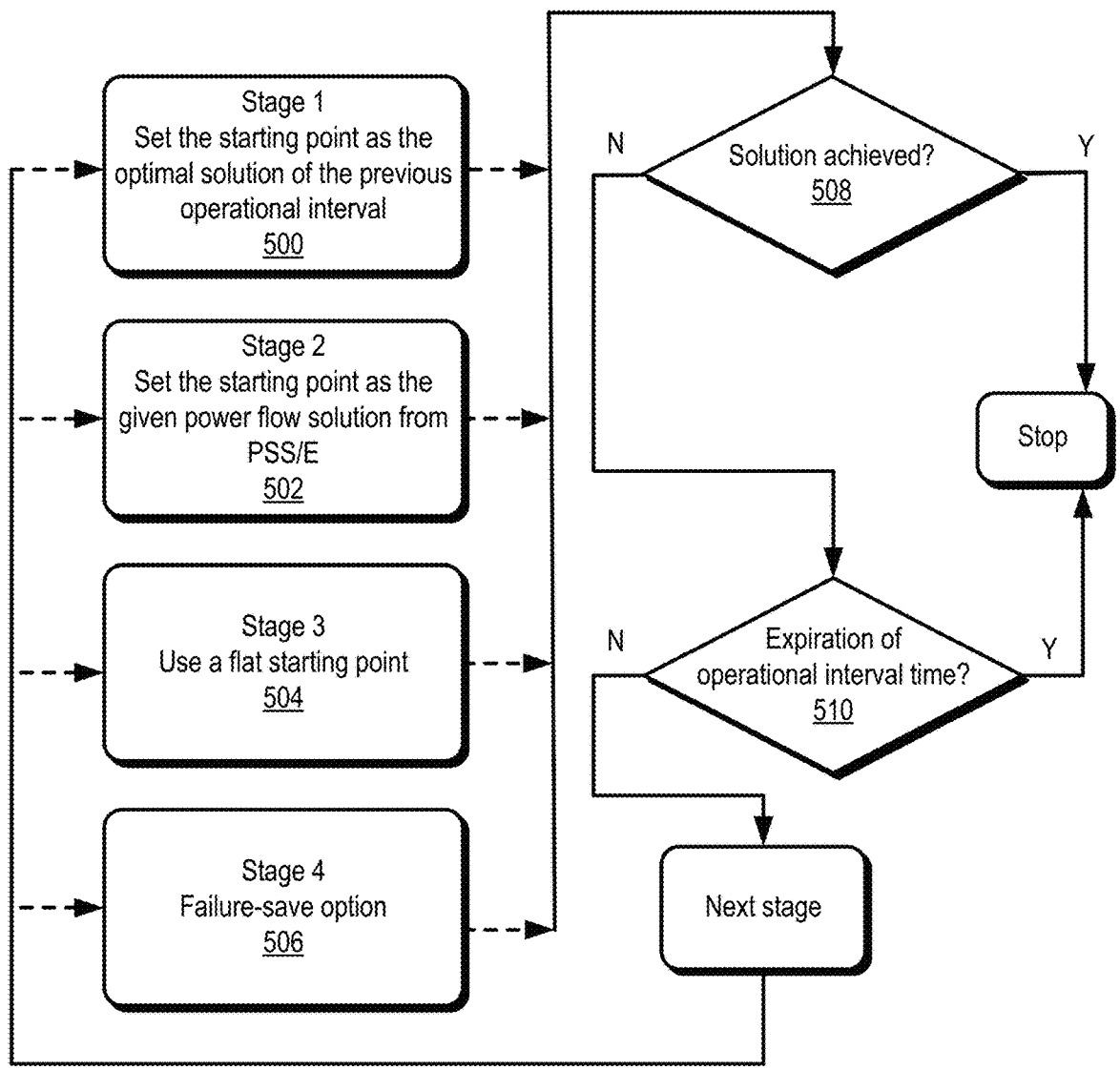
FIG. 5 is a flow-chart illustrating example operations of a multi-stage starting point selection process performed by a sub-transmission system configured to coordinate volt-var control with a distribution system.

FIG. 5 is a flow-chart illustrating example operations of a multi-stage starting point selection process performed by a sub-transmission system configured to coordinate volt-var control with a distribution system. FIG. 5 illustrates operations 500 through 510 and is described in the context of FIG. 1.

The quantity and frequency of switching operations executed by the sub-transmission controller 104 are limited by a maximum number of allowable operations and switching costs. As such, when executing an AC optimal power flow function, determining an initial input to the function can be very important. Typically, a solution to an AC optimal power flow function does vary within a few minutes (e.g., five-minute). There may only be a marginal change in a solution to an AC optimal power flow at each operational interval, unless there have been changes in generator commitment status. Therefore, at 500, during each operational interval, the sub-station controller 104 may use the previously generated solution from an AC optimal power flow function as a starting point for determining at 508 whether a solution to the AC optimal power flow function can be determined a current operational interval.

Heuristic information can help the sub-transmission controller 104 to find an optimal solution the AC optimal power flow function, however, there are still times when the sub-transmission controller 104 may have difficulty finding an optimal solution. The sub-transmission controller 104 may have difficulty finding an optimal solution particularly when the distribution system 106 that has a relatively large power-flow change caused by generator dispatch. Therefore, when the sub-transmission controller 104 fails to find an optimal solution, the sub-transmission controller 104 can re-execute the AC optimal power flow function with a different initial starting point at each of the different stages 1 through 4 (see steps 500, 502, 504, and 506). For example, at 502 the sub-transmission controller 104 executes the AC optimal power flow function with a solution provided by a power system simulator for engineering (PSS/E) as an initial starting point. At 504 the sub-transmission controller 104 executes the AC optimal power flow function with a default, flat starting point.

At 508, when the sub-transmission controller 104 fails to find an optimal solution from available starting points within the time requirement at 510, the sub-transmission controller 104 can return to the last "failure-save option" at 506 (which can be a solution to the AC optimal power flow function determined during a previous successful interval or some other solution that is less computationally taxing on the sub-transmission controller 104). In this failure-save option at 506, the sub-transmission controller 104 may start from a more feasible solution, such as the solution generated during a previous operational interval, and the sub-transmission controller 104 may improve the solution by executing an iterative processes starting with stage 1 at 500, and iteratively executing using stage 2, 3, or 4 until a solution is determined at 508, or time runs out during the solution interval at 510. If the sub-transmission controller 104 cannot find an optimal solution within the cut-off time at 510, the final solution can still serve as a feasible, although suboptimal, solution.

Figure 6A:
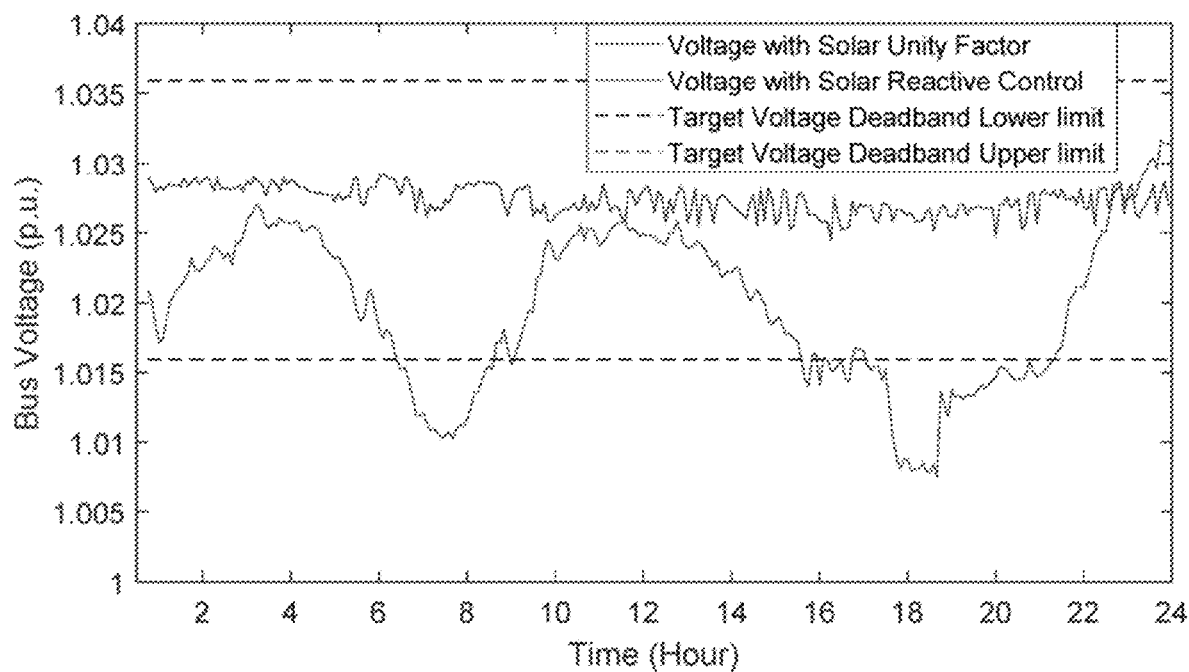
FIG. 6A is a voltage comparison that illustrates bus voltages at a distribution system configured to coordinate volt-var control with a sub-transmission system, and a distribution system that is not configured to coordinate volt-var control with a sub-transmission system.
Figure 6B:
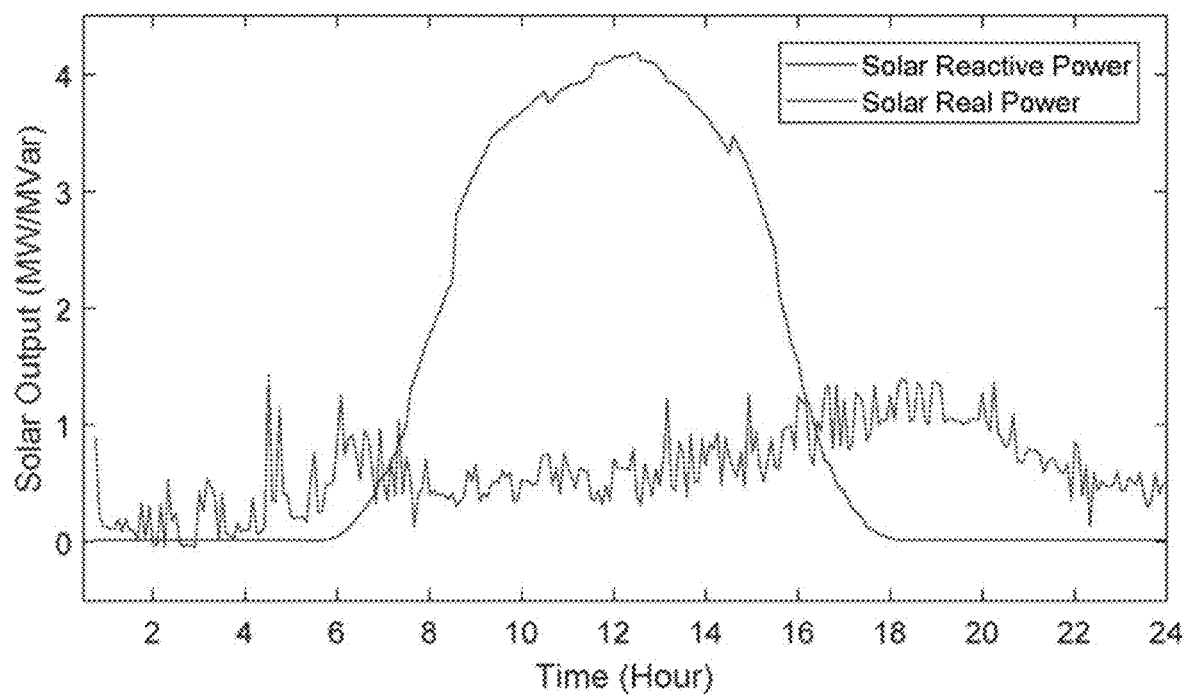
FIG. 6B is power function illustrating real and reactive power from a distributed energy resource associated with the bus voltages illustrated in FIG. 6A.

FIG. 6A is a voltage comparison that illustrates bus voltages at a distribution system configured to coordinate volt-var control with a sub-transmission system, and a distribution system that is not configured to coordinate volt-var control with a sub-transmission system. FIG. 6B is power function illustrating real and reactive power from a distributed energy resource associated with the bus voltages illustrated in FIG. 6A. When operating photovoltaic inverters, for example, at a unity power factor, there are under voltage problems around time 8:00 and 18:00 when no volt-var control coordination exists. When volt-var control coordination does exist, voltage is shown to be controlled within a target band or target threshold. As can be seen in FIG. 6B, the distributed energy resource generates reactive power to maintain the voltage within the desired target band. Also shown in FIG. 6B, virtual power plant resources and real power curtailment of the distributed energy resource may not be used, due to a relatively high penalty on their weighting coefficients.

Figure 7:
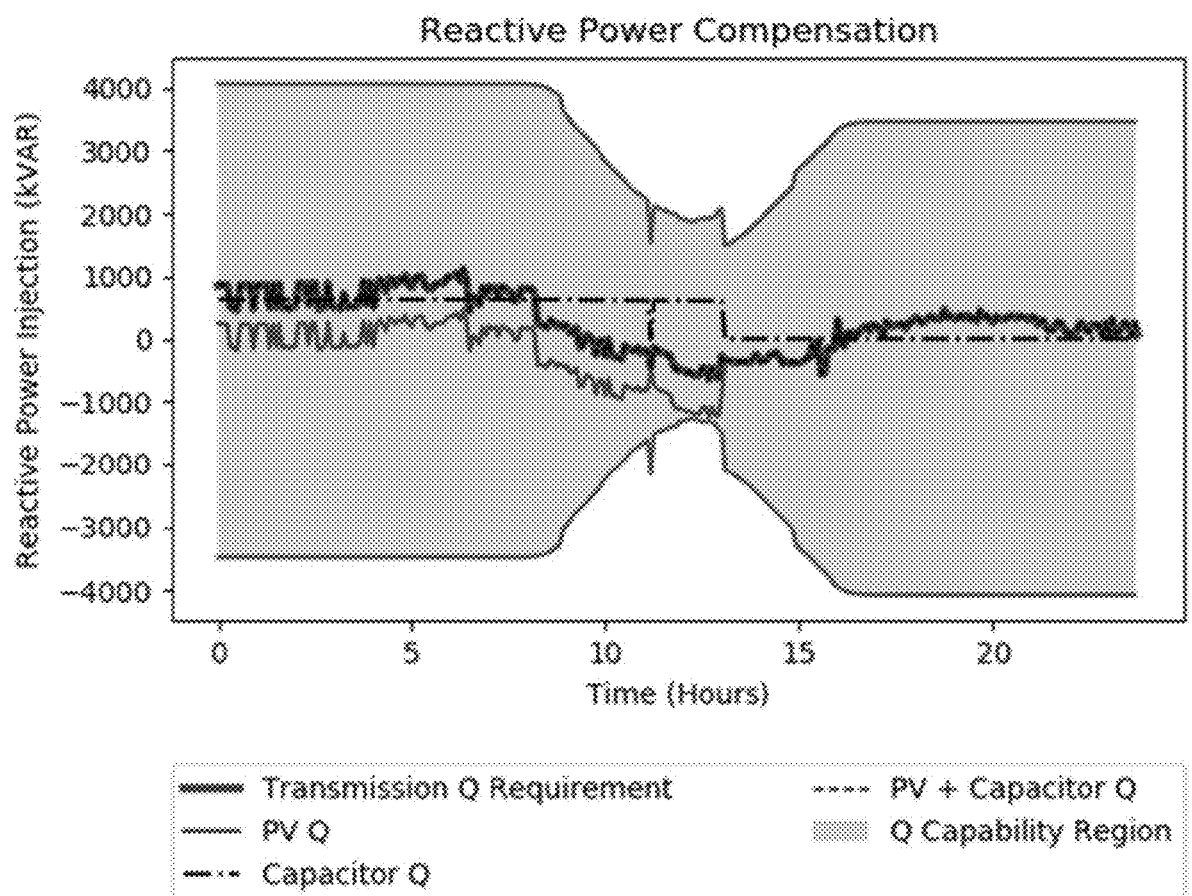
FIG. 7 illustrates coordination information exchanged between a distribution system and a sub-transmission system configured to coordinate volt-var control.

FIG. 7 illustrates coordination information exchanged between a distribution system and a sub-transmission system configured to coordinate volt-var control. As illustrated in FIG. 7, the reactive power associated with a photovoltaic distributed energy resource within the distribution system 106 can have similar Q capability most of the time. However, during the peak hours at midday (e.g., between 10:00 and 15:00), when the photovoltaic distributed energy resource has maximum real power output, the photovoltaic distributed energy resource may have relatively low reactive power control capability because of the real and reactive power constraints for photovoltaic distributed energy resource (see equation 27). Meanwhile, the reactive power requirements calculated from the AC optimal power flow function executed by the sub-transmission controller 104 can be met by the distribution system 106, because of the interactive exchange of coordination information between the sub-transmission controller 104 and the distribution controller 108, for each periodic (e.g., five minute) operating interval. Through exchanging coordination information with the distribution controller 108, the sub-transmission controller 104 can utilize (indirectly) the capability of the photovoltaic distributed energy resource to change reactive power over time to achieve the requirements of the subtransmission system 102.

Figure 8:
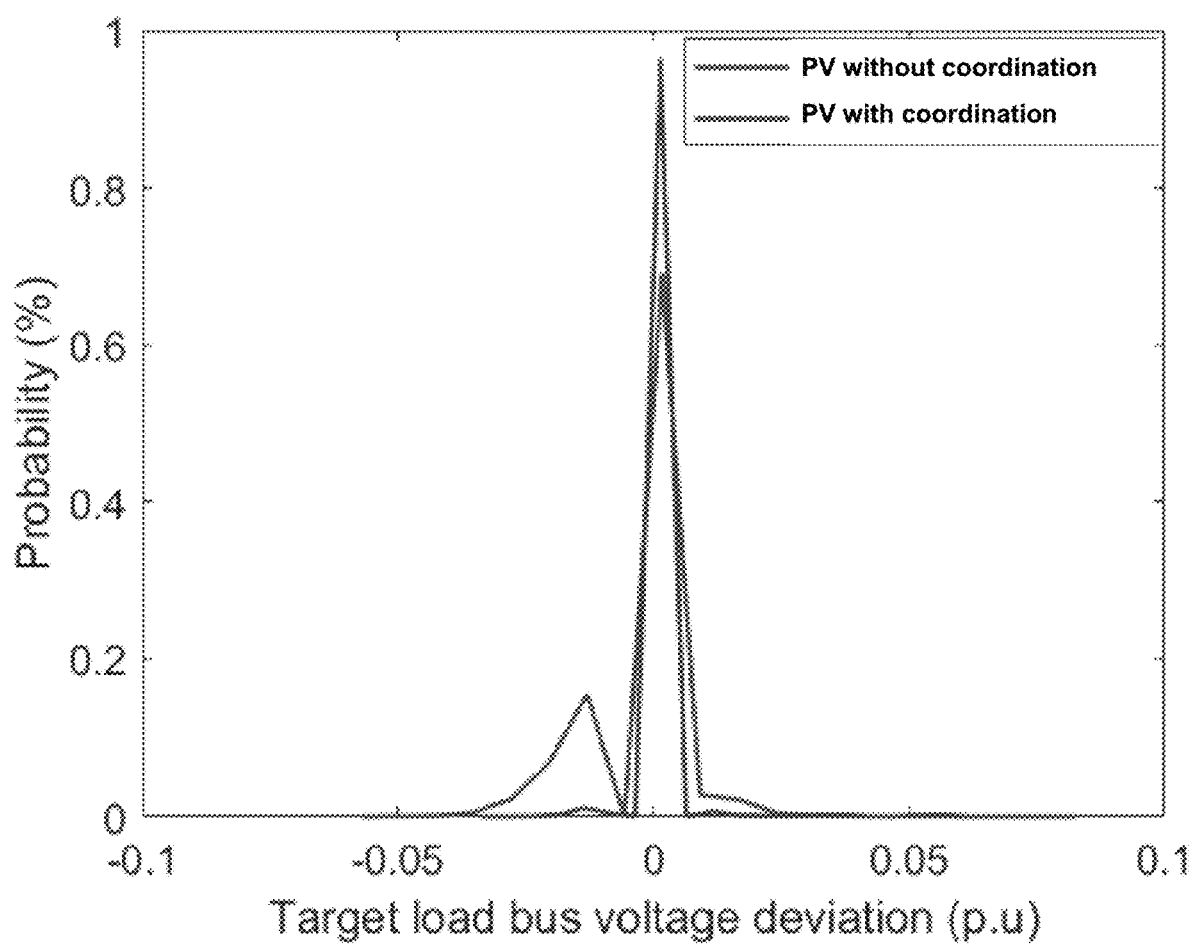
FIG. 8 illustrates a comparison between probability density functions of voltage deviations in a distribution system that is configured to coordinate volt-var control with a sub-transmission system a distribution system that is not configured to coordinate volt-var control with a sub-transmission system.

FIG. 8 illustrates a comparison between probability density functions of voltage deviations in a distribution system that is configured to coordinate volt-var control with a sub-transmission system a distribution system that is not configured to coordinate volt-var control with a sub-transmission system. As shown in FIG. 8, coordinating volt-var control between a distribution and sub-transmission system can significantly improve performance and prevent voltage problems from propagating to the sub-transmission system. Coordination enables the distribution and sub-transmission systems to maintain the voltages for target load buses within their operation limits at 98% of the time. A comparison of the average voltage deviations at different time steps is shown in Table 3.

TABLE 3

Comparison of average voltage deviations for load buses at different hours.

| | Hour of day | | | |
|---|---|---|---|---|
| | 0-2 | 3-5 | 6-8 | 9-11 |
| No coordination (%) | 0.24 | 0.27 | 0.27 | 0.28 |
| Coordination VCT (%) | 0.045 | 0.054 | 0.024 | 0.014 |
| | Hour of day | | | |
| | 12-14 | 15-17 | 18-20 | 21-23 |
| No coordination VCT (%) | 0.30 | 0.30 | 0.31 | 0.36 |
| Coordination VCT (%) | 0.018 | 0.024 | 0.008 | 0.012 |

Large voltage deviations usually occur in the afternoon and night-time periods (at least when photovoltaic distributed energy resources are used). When using coordination, the voltage deviations are maintained at less than 5% during most periods of the day. This comparison demonstrates the effectiveness of using virtual power plants and coordination for aggregating distributed energy resources in distribution systems to provide voltage support in transmission grids.

Figure 9:
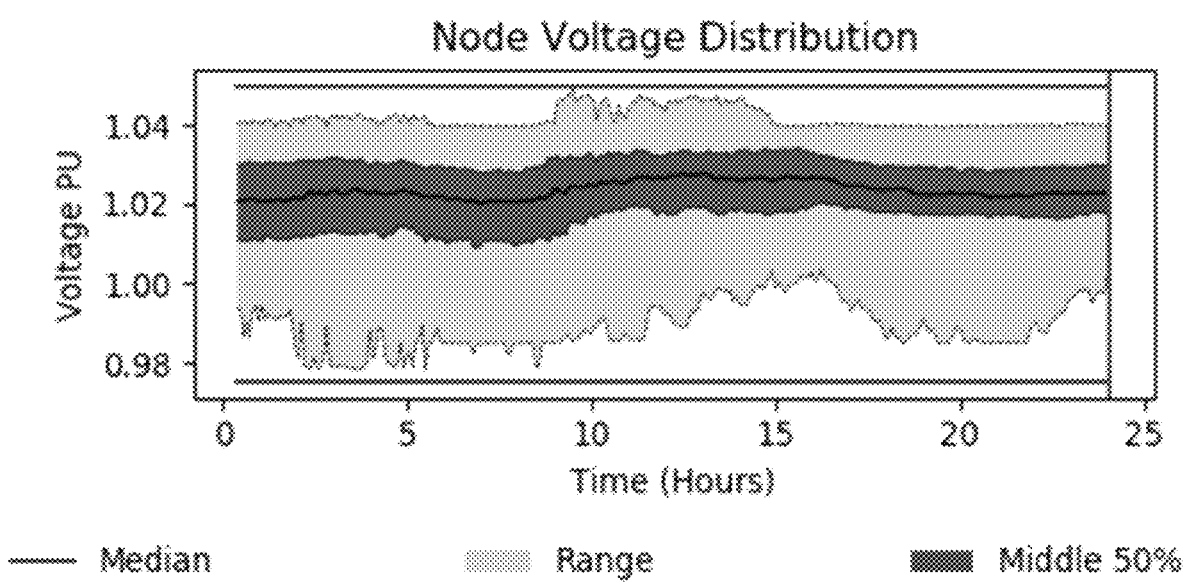
FIG. 9 illustrates voltage distributions for load nodes in a distribution system configured to coordinate volt-var control with a sub-transmission system.

FIG. 9 illustrates voltage distributions for load nodes in a distribution system configured to coordinate volt-var control with a sub-transmission system. FIG. 9 illustrates that the voltage distributions can be maintained within the target range (e.g., 0.95 p.u.-1.05 p.u.) by enabling the distribution controller 108 to control the distributed energy resource in coordination with the sub-transmission controller 104 that executes the AC optimal power flow (voltage control) function. System losses and mechanical switching of shunt elements have relatively lower weighting factors than voltage deviation. The comparison of system losses in a sub-transmission system at different hours of the day between a coordinated case and a case when no coordination occurs is shown in Table 4.

TABLE 4

Comparison of average system losses at different hours of the day.

| | Hour of day | | | |
|---|---|---|---|---|
| | 0-2 | 3-5 | 6-8 | 9-11 |
| No coordination (%) | 413 | 460 | 600 | 347 |
| Coordination VCT (%) | 400 | 451 | 574 | 350 |
| | Hour of day | | | |
| | 12-14 | 15-17 | 18-20 | 21-23 |
| No coordination VCT (%) | 247 | 344 | 480 | 380 |
| Coordination VCT (%) | 250 | 333 | 365 | 377 |

As shown in Table 4, relatively higher system losses can occur during the morning and night periods. When using coordination, the system losses are decreased (e.g., by 2.2% on average).

Figure 10A:
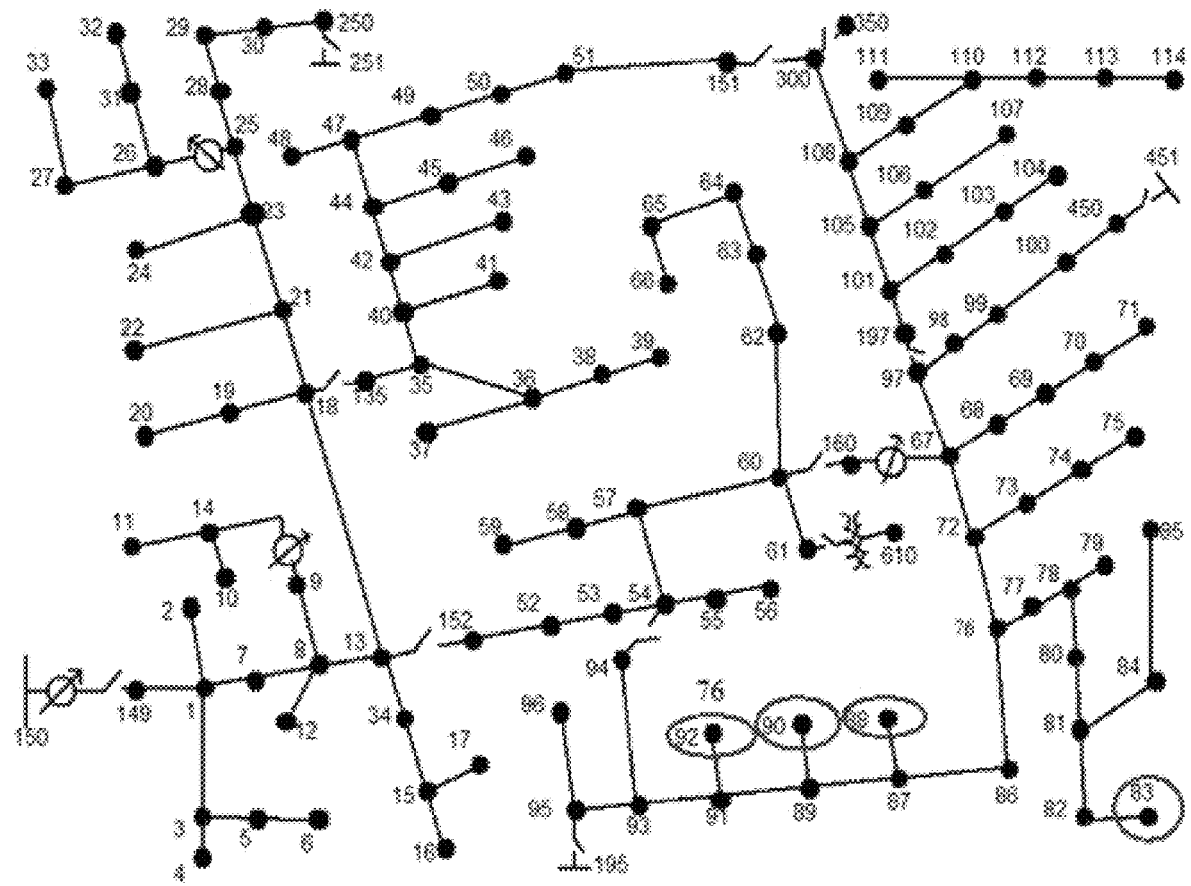
FIG. 10A illustrates an example IEEE 123-feeder system.

FIGS. 10A, 10B, and 11 through 17 are described in the context of several case studies performed using a simulation of the distribution system 106 coordinating volt-var control with the sub-transmission system 102. FIG. 10A illustrates an IEEE 123-feeder system which is an example of the distribution system 106. The voltage level is 4.16 kV. There are 91 nodes, which are connected with loads. The peak load is 3227 kW/1625 kvar.

Figure 10B:
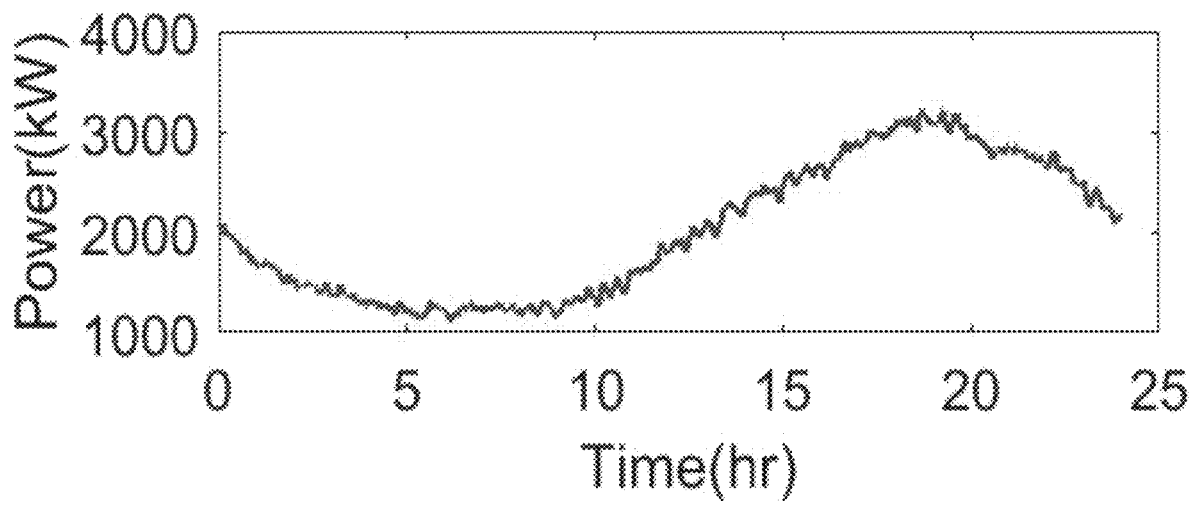
FIG. 10B illustrates a total load profile of the feeder head of the IEEE 123-feeder system illustrated in FIG. 10A.

FIG. 10B illustrates a total load profile of the feeder head of the IEEE 123-feeder system illustrated in FIG. 10A. The PV installation capacity is 3125 kW. There are four capacitors installed at nodes 83, 88, 90, 92, with capacities of 200 kvar, 50 kvar, 50 kvar, and 50 kvar respectively.

Figure 11:
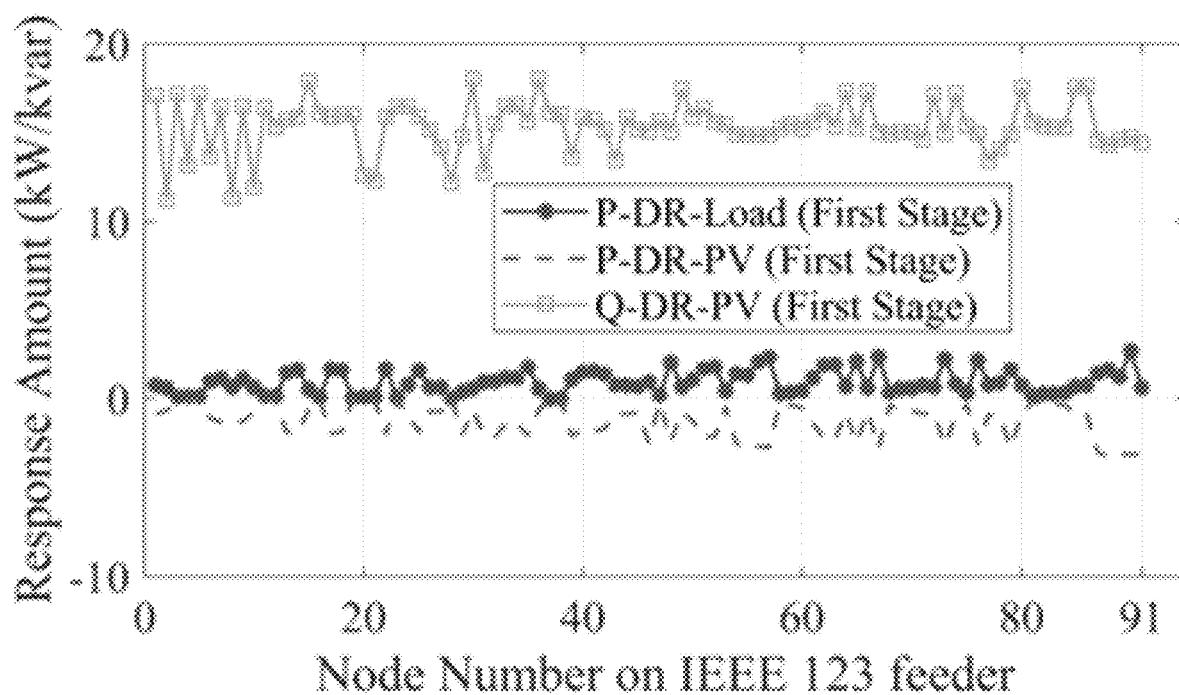
FIG. 11 illustrates dispatch results for a virtual power plant at each node in the IEEE 123-feeder system illustrated in FIG. 10A during a first test.

FIG. 11 illustrates dispatch results for a virtual power plant at each node in the IEEE 123-feeder system illustrated in FIG. 10A. In a first case (i.e. "Case 1"), the performance of the first-stage of the two-stage control function executed by the distribution controller 108 is tested. FIG. 11 illustrates the dispatch results for the virtual power plant at each of the 91 nodes in the IEEE 123-feeder system to meet the sub-transmission-level virtual power plant requests during the first-stage test of the two-stage control function executed by a distribution controller of the IEEE 123-feeder system.

The virtual power plant request received by the distribution controller of the IEEE 123-feeder system are $P_{DR}^{Total}=200$ kW (the required real power increase) and $Q_{DR}^{Total}=1400$ kvar (the required reactive power injection). At each node, the controllable loads are switched-on to consume more energy while the photovoltaic distributed energy resource within the IEEE 123-feeder system is curtailed so that the IEEE 123-feeder system will consume more real power. To inject reactive power into a sub-transmission system (e.g., the sub-transmission system 102), smart photovoltaic inverters in the IEEE 123-feeder system generate reactive power and feed the reactive power to the sub-transmission system.

Figure 12:
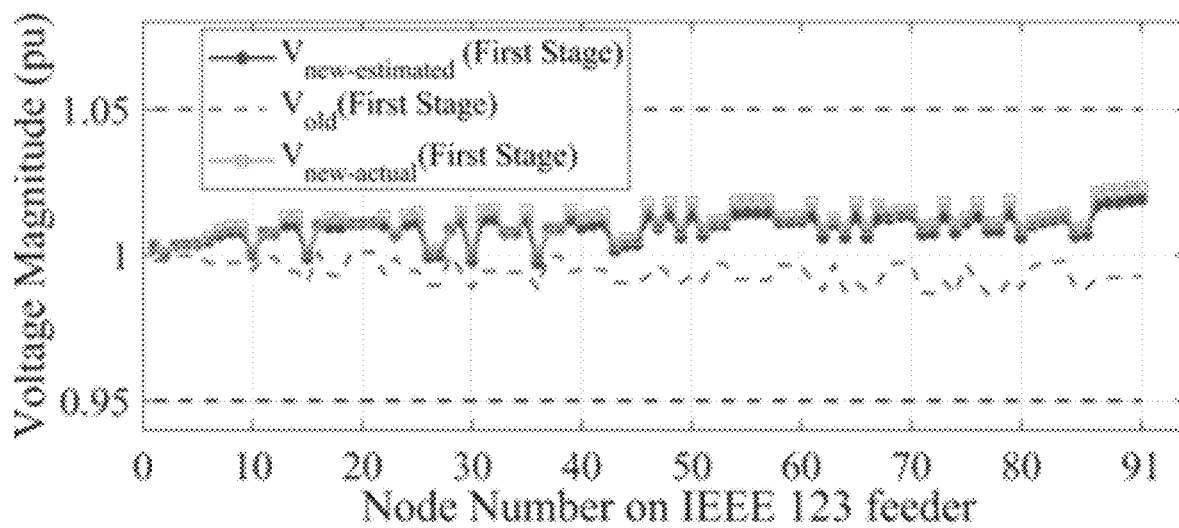
FIG. 12 illustrates voltage profiles before and after the IEEE 123-feeder system responds to virtual power plant requests from a sub-transmission system during the first test.

FIG. 12 illustrates voltage profiles before and after the IEEE 123-feeder system responds to virtual power plant requests from a sub-transmission system. The voltage profiles before and after the virtual power plant at each node of the distribution feeder are plotted in FIG. 12. In this figure, $V_{noDR}$ is the voltage before implementing the virtual power plant; $V_{DR}^{estimated}$ is the estimated voltage calculated using a sensitivity matrix and virtual power plant optimization results; and $V_{DR}^{actual}$ is the actual voltage after the virtual power plant deployment.

Unlike other systems, the IEEE 123-feeder system (which again is an example of the distribution system 106) can use a single sensitivity matrix to calculate voltage for all cases (for example, in a time-series, calculating every five minutes for a 24-hour period for 91 nodes means 26,208 cases). To eliminate the complex power flow calculation and reduce the time required to solve the optimization problem, the described techniques use power deviation multiplied by the sensitivity matrix to calculate voltage in the optimization formulation. The results in Table 5 demonstrate that the percentage error of the estimated voltage, defined as $|V_{actual}-V_{estimated}|/V_{actual}$, is very small, showing that the estimated voltage is very close to the actual voltage.

TABLE 5

Error Percentage for First-Stage Control Case

| Mean | Minimum | Median | Maximum |
|---|---|---|---|
| 0.16% | $1.39 \times 10^{-3}$% | 0.17% | 0.35% |

In this case, $\bar{\omega}_1$ and $\bar{\omega}_2$ are both set at 0.5. The ΔV is 0.017 p.u. and the total cost is $1589. If the weight coefficients are adjusted to $\bar{\omega}_1=0.2$ and $\bar{\omega}_2=0.8$, the results will be ΔV=0.014 p.u. and total cost=$1619 because the optimization, in this example, places heavier emphasis on minimizing the voltage deviation.

In a second case (i.e. "Case 2"), the performance of the second-stage of the two-stage control function executed by the distribution controller 108 is tested. Case 2 demonstrates how to perform the second-stage control function for eliminating voltage violations.

Figure 13:
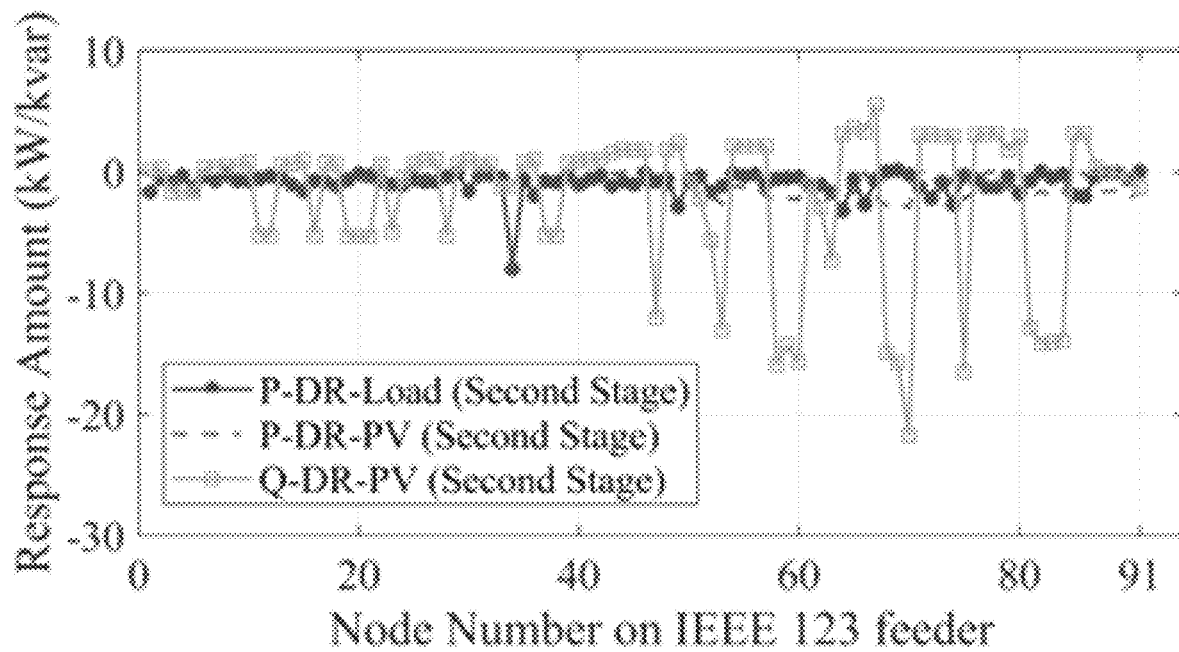
FIG. 13 illustrates dispatch results for a virtual power plant at each node in the IEEE 123-feeder system illustrated in FIG. 10A during a second test.
Figure 14:
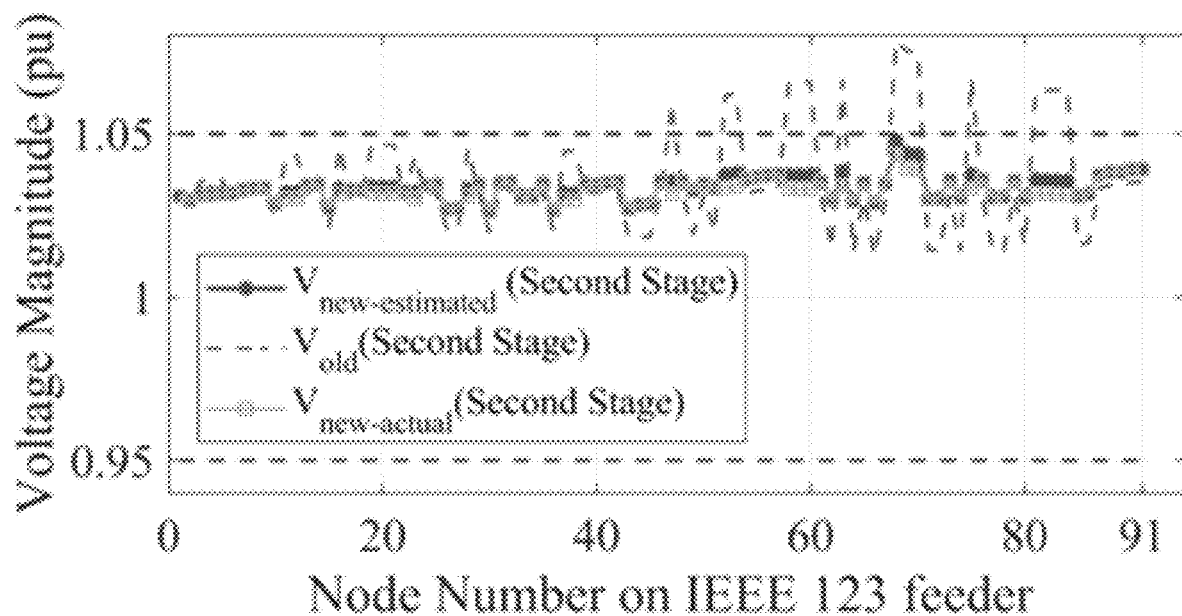
FIG. 14 illustrates voltage profiles before and after the IEEE 123-feeder system responds to virtual power plant requests from a sub-transmission system during the second test.

FIG. 13 illustrates dispatch results for a virtual power plant at each node in the IEEE 123-feeder system illustrated in FIG. 10A during a second test. FIG. 14 illustrates voltage profiles before and after the IEEE 123-feeder system responds to virtual power plant requests from a sub-transmission system during the second test. As shown in FIGS. 13 and 14, by providing reactive compensation using smart inverters, all voltage violations have been eliminated after the second-stage control strategy is implemented. The optimization objective in the second stage is to minimize the response cost and the response amount so that the accomplish rate (defined in (42) below) for the required transmission response can be maintained at a high level. The total real power response of this second-stage control case is 31.04 kW (increase), and the total reactive power response amount is 191.2582 kvar (absorption). The requirements from the transmission system are 400 kW (decrease) and 3000 kvar (generation), for real and reactive power, respectively. The accomplish rates are 92.24% and 93.63%.

$$\text{accomplish rate} = \frac{|P_{DR}^{Total}| - |P_{DR}^{Total}|_2}{|P_{DR}^{Total}|} \quad (42)$$

Table 6 shows that the calculation errors resulting from using VLSM instead of solving power flows are very small.

TABLE 6

Error Percentage for Second-Stage Control Case

| Mean | Minimum | Median | Maximum |
|---|---|---|---|
| 0.066% | $3.99 \times 10^{-5}$% | 0.046% | 0.16% |

Figure 15:
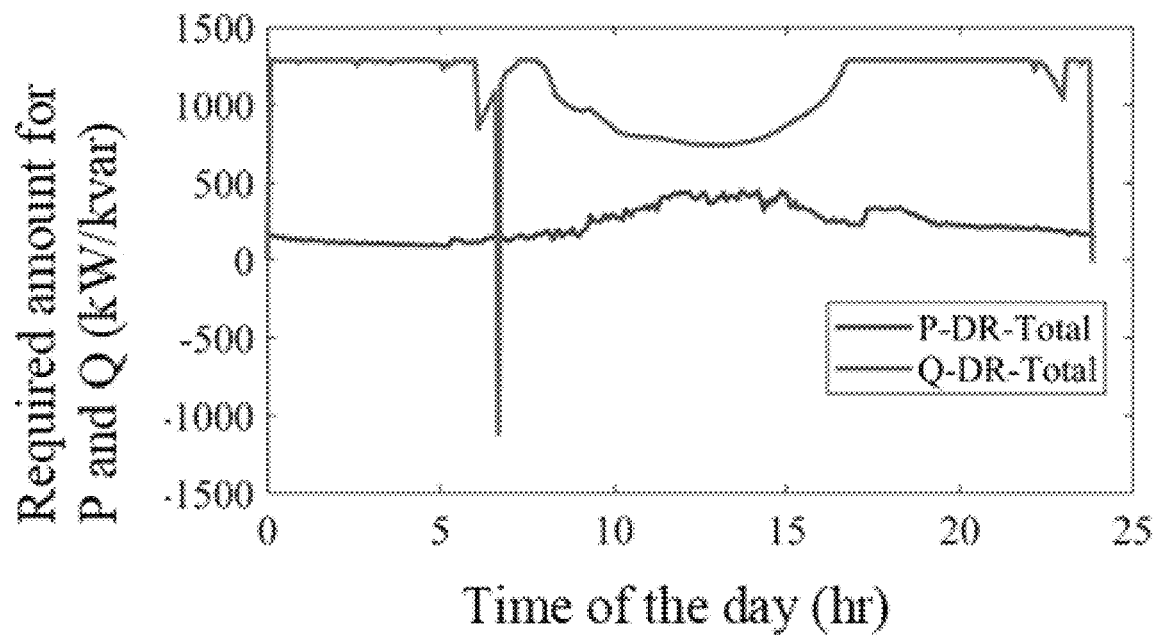
FIG. 15 illustrates response requirements obtained from a sub-transmission system by the IEEE 123-feeder system illustrated in FIG. 10A during a third test.
Figure 16:
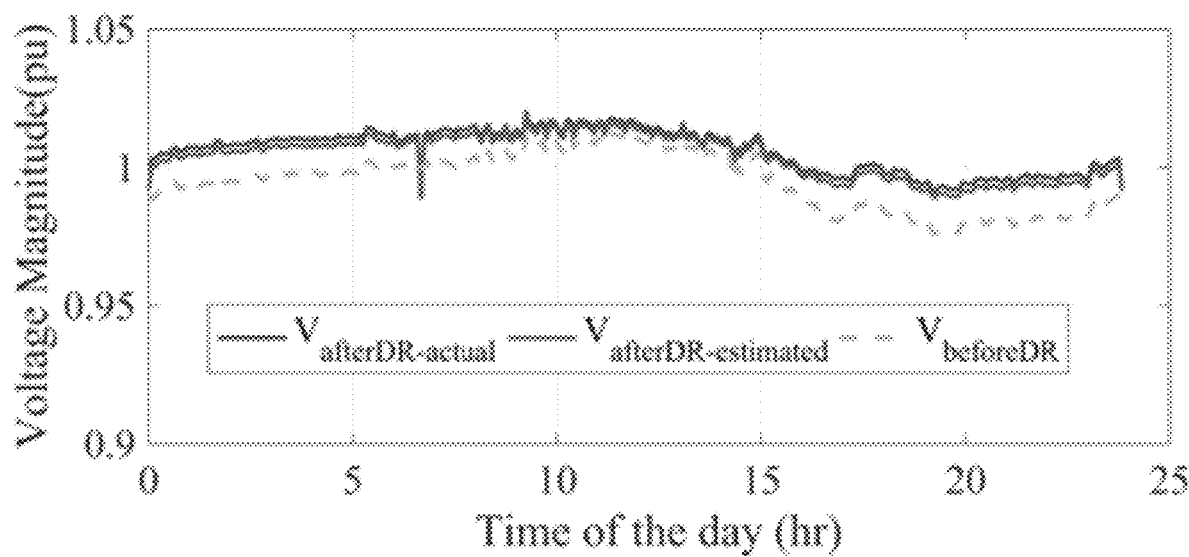
FIG. 16 illustrates dispatch results for a virtual power plant at each node in the IEEE 123-feeder system illustrated in FIG. 10A during a third test.
Figure 17:
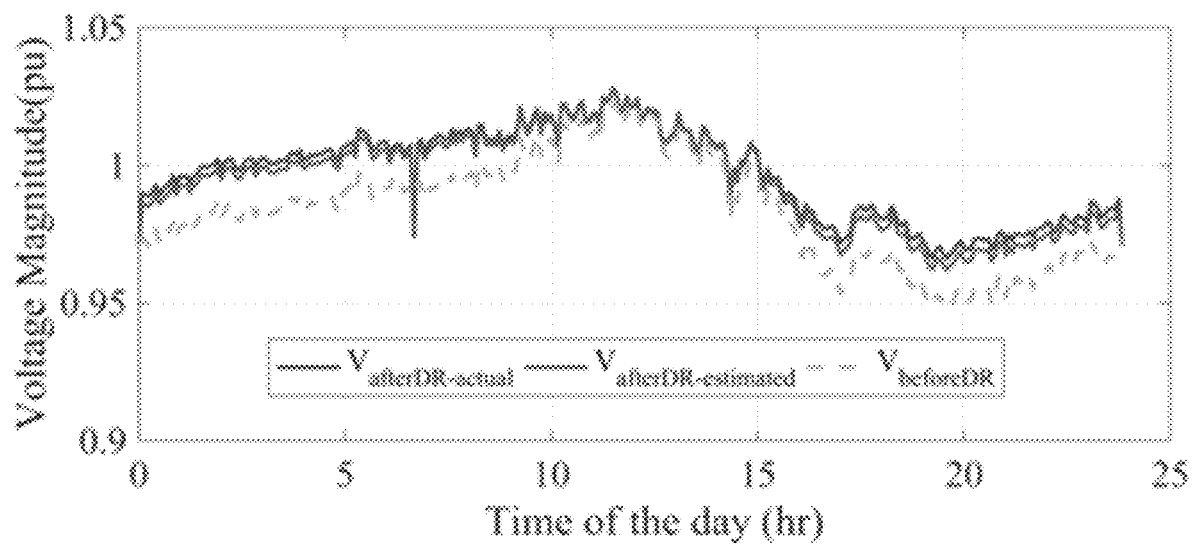
FIG. 17 illustrates voltage profiles before and after the IEEE 123-feeder system responds to virtual power plant requests from a sub-transmission system during the third test.

In a third case (i.e. "Case 3"), the performance of the overall, two-stage control function executed by the distribution controller 108 is tested over a 24-hour time period. FIG. 15 illustrates response requirements obtained from a sub-transmission system by the IEEE 123-feeder system illustrated in FIG. 10A during a third test. FIG. 16 illustrates dispatch results for a virtual power plant at each node in the IEEE 123-feeder system illustrated in FIG. 10A during the third test. FIG. 17 illustrates voltage profiles before and after the IEEE 123-feeder system responds to virtual power plant requests from a sub-transmission system during the third test.

In Case 3, two-stage control function executed by the distribution controller 108 is executed every five minutes. The voltage profiles at two sample nodes before and after the control strategy is performed are shown in FIGS. 16 and 17, respectively. It can be seen that the voltage profiles after virtual power plants, are within the limits and do not have large fluctuations. The voltage dip in the morning is caused by a large reactive power absorption requirement of the transmission system.

Considering all the nodes in the 123-feeder system, the maximum and minimum voltage magnitudes during this day are shown in Table 7. It can be seen that the nodes are all within the limitation. The error rate statistics for all 26,208 cases are checked. The error rate statistics are shown in Table 8; it can be observed that the error rate is very small:

the maximum is 1%. This further demonstrates that using a sensitivity matrix in accordance with the described techniques, to substitute the power flow calculation, are computationally efficient and the results are satisfactory.

TABLE 7

Voltage Range for Case C

| Maximum voltage (p.u.) | Minimum voltage (p.u.) |
|---|---|
| 1.0328 | 0.9598 |

TABLE 8

Error Percentage for Time-Series Study (Case C)

| Mean | Minimum | Median | Maximum |
|---|---|---|---|
| 0.25% | $8.34 \times 10^{-6}$% | 0.3% | 1% |

The described techniques for coordinating volt-var control between sub-transmission and distribution systems have been simulated and verified on an IEEE test system, including a Duke Energy system with more than three thousand buses. Hardware in the loop simulations have also been performed to verify the feasibility and benefits of implementing the described techniques.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method performed by a sub-transmission system for coordinating volt-var control with a distribution system, the method comprising:
   receiving, by a sub-transmission controller of the sub-transmission system and from an energy management system, operational set points of the sub-transmission system;
   determining, by the sub-transmission controller and based on the operational set points, virtual power plant requirements for the distribution system that minimize voltage deviations and system losses using weighted multi-objective optimization;
   sending, by the sub-transmission controller and to a distribution controller of the distribution system, the virtual power plant requirements to achieve the operational set points of the sub-transmission system;
   receiving, from the distribution controller of the distribution system, future virtual power plant capacity of the distributed system; and
   storing the future virtual power plant capacity of the distribution system for determining future virtual power plant requirements for the distribution system that minimize voltage deviations and system losses during subsequent operational intervals using weighted multi-objective optimization.

2. The method of claim 1, wherein the operational set points are initial operational set points, the method further comprising:
   receiving subsequent operational set points of the sub-transmission system;
   determining, based on the subsequent operational set points and the future virtual power plant capacity of the distribution system, subsequent virtual power plant requirements for the distribution system; and
   sending, to the distribution controller of the distribution system, the subsequent virtual power plant requirements to achieve the subsequent operational set points of the sub-transmission system.

3. The method of claim 1, wherein determining the virtual power plant requirements for the distribution system comprises executing, by the sub-transmission controller and based on the set points, an operational power flow function that outputs the virtual power plant requirements for the distribution system.

4. The method of claim 3, further comprising:
   determining a previously determined solution to the operational power flow function; and
   executing the operational power flow function using the previously determined solution to the operational power flow function as an initial starting point.

5. The method of claim 4, further comprising:
   responsive to failing to determine a solution to the operational power flow function using the previously determined solution as the initial starting point, selecting a different initial starting point; and
   executing the operational power flow function using the different initial starting point as the initial starting point, wherein the different initial starting point comprises an output from a power system simulator for engineering, a flat starting point, or a failure-save starting point.

6. The method of claim 5, further comprising:
   failing to determine the solution to the operational power flow function in response to expiration of a timer associated with the operational power flow function prior to the solution to the operational power flow function being achieved.

7. The method of claim 1, wherein the distribution system is a first distribution system from a group of distribution systems, the method further comprises:
   determining, by the sub-transmission controller and based on the operational set points, respective virtual power plant requirements for each distribution system from the group of distribution systems; and
   sending, by the sub-transmission controller and to a respective distribution controller of each distribution system from the group of distribution systems, respective virtual power plant requirements to achieve the operational set points of the sub-transmission system, wherein the respective virtual power plant requirements sent to the respective distribution controller of the first distribution system are different than the respective virtual power plant requirements sent to the respective distribution controller of at least one other distribution system from the group of distribution systems.

8. A sub-transmission system comprising:
   a sub-transmission controller configured to:
   receive, from an energy management system, operational set points of the sub-transmission system;
   determine, based on the operational set points, virtual power plant requirements for a distribution system that minimize voltage deviations and system losses using weighted multi-objective optimization;

send, to a distribution controller of a distribution system, the virtual power plant requirements to achieve the operational set points of the sub-transmission system;

receive, from the distribution controller of the distribution system, future virtual power plant capacity of the distribution system; and store the future virtual power plant capacity of the distribution system for determining future virtual power plant requirements for the distribution system that minimize voltage deviations and system losses during subsequent operational intervals using weighted multi-objective optimization.

9. A non-transitory computer-readable storage medium comprising instructions that, when executed, configure a sub-transmission controller of a sub-transmission system to:

receive, from an energy management system, operational set points of the subs-transmission system;

determine, based on the operational set points, virtual power plant requirements for a distribution system that minimize voltage deviations and system losses using weighted multi-objective optimization;

send, to a distribution controller of a distribution system, the virtual power plant requirements to achieve the operational set points of the sub-transmission system;

receive, from the distribution controller of the distribution system, future virtual power plant capacity of the distribution system; and store the future virtual power plant capacity of the distribution system for determining future virtual power plant requirements for the distribution system that minimize voltage deviations and system losses during subsequent operational intervals using weighted multi-objective optimization.

10. A method performed by a distribution system for coordinating volt-var control with a sub-transmission system, the method comprising:

receiving, by a distribution controller of the distribution system and from a sub-transmission controller of the sub-transmission system, virtual power plant requirements of the sub-transmission system;

controlling, by the distribution controller, based on the virtual power plant requirements, one or more distributed energy resources of the distribution system to minimize voltage deviations and system losses using weighted multi-objective optimization;

responsive to controlling the one or more distributed energy resources, determining, by the distribution controller, future virtual power plant capacity of the one or more distributed energy resources; and sending, by the distribution controller and to the sub-transmission controller, the future virtual power plant capacity.

11. The method of claim 10, further comprising:

receiving, from the sub-transmission controller, subsequent virtual power plant requirements of the sub-transmission system that are within the future virtual power plant capacity previously sent to the sub-transmission controller; and controlling, by the distribution controller, based on the subsequent virtual power plant requirements, the one or more distributed energy resources of the distribution system.

12. The method of claim 10, wherein controlling the one or more distributed energy resources of the distribution system based on the virtual power plant requirements comprises:

executing a two-stage, virtual power plant control strategy that outputs virtual power plant constraints $P_{DR}^{limit}|_{high}$, $P_{DR}^{limit}|_{low}$, $Q_{DR}^{limit}|_{high}$, and $Q_{DR}^{limit}|_{low}$; and determining, by the distribution controller, the future virtual power plant capacity of the one or more distributed energy resources based on the virtual power plant constraints $P_{DR}^{limit}|_{high}$, $P_{DR}^{limit}|_{low}$, $Q_{DR}^{limit}|_{high}$, and $Q_{DR}^{limit}|_{low}$.

13. The method of claim 12, wherein executing the two-stage, virtual power plant control strategy comprises:

controlling, by the distribution controller, based on the virtual power plant requirements, the one or more distributed energy resources of the distribution system by relaxing constraints on nodal voltage limits to the distribution system.

14. The method of claim 13, wherein executing the two-stage, virtual power plant control strategy comprises:

responsive to controlling the one or more distributed energy resources of the distribution system by relaxing the constraints on nodal voltage limits to the distribution system, determining whether the constraints on the nodal voltage limits were violated; and responsive to determining that the constraints on the nodal voltage limits were violated, controlling, by the distribution controller, the one or more distributed energy resources of the distribution system to eliminate violations to the constrains on the nodal voltage limits by minimizing virtual power plant cost and total virtual power plant amount of the one or more distributed energy resources.

15. The method of claim 14, wherein controlling the one or more distributed energy resources of the distribution system based on the virtual power plant requirements disaggregates the virtual power plant requirements from the sub-transmission controller to identify the one or more distributed energy resources for achieving the virtual power plant requirements.

16. The method of claim 15, wherein the virtual power plant requirements are associated with a virtual power plant of the distribution system, wherein the virtual power plant aggregates multiple distributed energy resources of the distribution system for sub-transmission control, wherein disaggregating the virtual power plant requirements comprises identifying the multiple distributed energy resources associated with the virtual power plant prior to controlling the one or more distributed energy resources of the distribution system based on the virtual power plant requirements.

17. The method of claim 15, further comprising using a sensitivity matrix to further identify the one or more distributed energy resources for achieving the virtual power plant requirements such that virtual power plant cost and overall voltage deviations are minimized.

18. A distribution system comprising:

one or more distributed energy resources; and a distribution controller configured to:

receive, from a sub-transmission controller of a sub-transmission system, virtual power plant requirements of the sub-transmission system;

control, based on the virtual power plant requirements, the one or more distributed energy resources of the distribution system to minimize voltage deviations and system losses using weighted multi-objective optimization;

responsive to controlling the one or more distributed energy resources, determining future virtual power plant capacity of the one or more distributed energy resources; and sending, to the sub-transmission controller, the future virtual power plant capacity.

19. A non-transitory computer-readable storage medium comprising instructions that, when executed, configure a distribution controller of a distribution system to:

receive, from a sub-transmission controller of a sub-transmission system, virtual power plant requirements of the sub-transmission system;

control, based on the virtual power plant requirements, one or more distributed energy resources of the distribution system to minimize voltage deviations and system losses using weighted multi-objective optimization;

responsive to controlling the one or more distributed energy resources, determining future virtual power plant capacity of the one or more distributed energy resources; and sending, to the sub-transmission controller, the future virtual power plant capacity.

20. The method of claim 1, wherein receiving future virtual power plant capacity of the distributed system comprises:

receiving upper and lower limits for real and reactive power adjustments during subsequent operational intervals.

* * * * *